United States Patent
Friedman

(10) Patent No.: US 11,743,184 B2
(45) Date of Patent: *Aug. 29, 2023

(54) MESSAGE VALIDATION USING DATA-LINK LAYER FIELDS

(71) Applicant: Seth Gregory Friedman, Tokyo (JP)

(72) Inventor: Seth Gregory Friedman, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,245

(22) Filed: Jul. 20, 2022

(65) Prior Publication Data
US 2022/0377011 A1    Nov. 24, 2022

Related U.S. Application Data

(63) Continuation of application No. 16/952,773, filed on Nov. 19, 2020, now Pat. No. 11,431,628, which is a continuation of application No. 16/864,447, filed on May 1, 2020, now Pat. No. 10,880,211.

(60) Provisional application No. 62/843,678, filed on May 6, 2019.

(51) Int. Cl.
*H04L 45/00* (2022.01)
*H04L 43/04* (2022.01)

(52) U.S. Cl.
CPC ............. *H04L 45/70* (2013.01); *H04L 43/04* (2013.01); *H04L 45/66* (2013.01)

(58) Field of Classification Search
CPC .......... H04L 45/70; H04L 45/66; H04L 43/04
USPC ....................................................... 370/392
See application file for complete search history.

(56) References Cited

U.S. PATENT DOCUMENTS

| | | | |
|---|---|---|---|
| 5,926,473 A | 7/1999 | Gridley | |
| 6,327,242 B1 | 12/2001 | Amicangioli et al. | |
| 6,522,656 B1 | 2/2003 | Gridley | |
| 6,535,509 B2 | 3/2003 | Amicangioli et al. | |

(Continued)

FOREIGN PATENT DOCUMENTS

| | | |
|---|---|---|
| KR | 10-2013-0126833 | 11/2013 |
| WO | 2005/107142 | 11/2005 |
| WO | 2016/130696 | 8/2016 |

OTHER PUBLICATIONS

Non-Final Office Action, U.S. Appl. No. 17/730,789, dated Nov. 7, 2022, 14 pages.

(Continued)

*Primary Examiner* — Faisal Choudhury
(74) *Attorney, Agent, or Firm* — McDonnell Boehnen Hulbert & Berghoff LLP

(57) ABSTRACT

A device may include a first interface and a second interface. The device may also include memory containing a set of rules and representations of pre-defined violations thereof. The device may also include digital logic programmed to: (i) receive, by way of the first interface, an Ethernet frame containing Ethernet header fields and an Ethernet payload, wherein the Ethernet payload contains a payload; (ii) extract data from the Ethernet header fields, wherein the data defines a transaction that is functionally equivalent to a further transaction that is defined by the payload; (iii) apply the set of rules to the transaction, wherein doing so involves comparing fields in the data to values and concluding that the transaction does not contain any pre-defined violations; and (iv) modify the Ethernet frame to contain content based on the payload, and transmit the Ethernet frame out the second interface.

19 Claims, 12 Drawing Sheets

(56) References Cited

U.S. PATENT DOCUMENTS

| | | | |
|---|---|---|---|
| 6,963,575 | B1 | 11/2005 | Sistanizadeh et al. |
| 7,224,669 | B2 | 5/2007 | Kagan et al. |
| 7,230,947 | B1 | 6/2007 | Huber et al. |
| 7,500,004 | B1 | 3/2009 | Homer |
| 7,636,703 | B2 | 12/2009 | Taylor |
| 7,640,208 | B2 | 12/2009 | Grossman |
| 7,640,298 | B2 | 12/2009 | Berg |
| 7,680,718 | B2 | 3/2010 | Brandes et al. |
| 7,685,281 | B1 | 3/2010 | Saraiya et al. |
| 7,707,098 | B2 | 4/2010 | West et al. |
| 7,827,087 | B2 | 11/2010 | Adatia et al. |
| 7,840,481 | B2 | 11/2010 | Aloe et al. |
| 7,873,560 | B2 | 1/2011 | Reich et al. |
| 7,921,046 | B2 | 4/2011 | Parsons et al. |
| 8,014,274 | B1 | 9/2011 | Amicangioli et al. |
| 8,296,221 | B1 | 10/2012 | Waelbroeck et al. |
| 8,751,364 | B2 | 6/2014 | Gaber et al. |
| 8,879,570 | B2 * | 11/2014 | Nagapudi ............... H04L 12/12 370/420 |
| 9,055,114 | B1 | 6/2015 | Talaski et al. |
| 9,246,876 | B1 * | 1/2016 | Melam ..................... H04L 67/14 |
| 9,501,795 | B1 | 11/2016 | Friedman |
| 11,252,110 | B1 | 2/2022 | Malin et al. |
| 2002/0056039 | A1 | 5/2002 | Lim et al. |
| 2002/0156721 | A1 | 10/2002 | Lyback |
| 2004/0117438 | A1 | 6/2004 | Considine et al. |
| 2004/0236888 | A1 | 11/2004 | Dieffenderier et al. |
| 2005/0122966 | A1 | 6/2005 | Bowes |
| 2005/0232161 | A1 | 10/2005 | Maufer et al. |
| 2007/0223448 | A1 | 9/2007 | Tanazawa |
| 2007/0291753 | A1 | 12/2007 | Romano |
| 2008/0013547 | A1 | 1/2008 | Kiessig et al. |
| 2008/0212595 | A1 * | 9/2008 | Figueira ............. H04L 12/4675 370/401 |
| 2008/0243675 | A1 | 10/2008 | Parsons et al. |
| 2009/0157452 | A1 | 6/2009 | Arora et al. |
| 2010/0070839 | A1 | 3/2010 | Shigihara et al. |
| 2010/0082474 | A1 | 4/2010 | Beaumont |
| 2010/0094743 | A1 | 4/2010 | Robertson et al. |
| 2010/0095277 | A1 | 4/2010 | Cheng et al. |
| 2010/0174770 | A1 | 7/2010 | Pandya |
| 2011/0016221 | A1 | 1/2011 | Amicangioli et al. |
| 2011/0110266 | A1 * | 5/2011 | Li ........................ H04W 28/24 370/253 |
| 2011/0299409 | A1 | 12/2011 | Vobbilisetty et al. |
| 2012/0130919 | A1 | 5/2012 | Gaber |
| 2012/0166327 | A1 | 6/2012 | Amicangioli |
| 2012/0184242 | A1 | 7/2012 | Li et al. |
| 2013/0091349 | A1 | 4/2013 | Chopra |
| 2013/0107892 | A1 | 5/2013 | Rubin et al. |
| 2013/0117621 | A1 | 5/2013 | Saraiya et al. |
| 2014/0328354 | A1 * | 11/2014 | Michael ............. H04N 21/4343 370/474 |
| 2015/0019748 | A1 | 1/2015 | Gross et al. |
| 2015/0095207 | A1 | 4/2015 | Kodde |
| 2015/0095613 | A1 | 4/2015 | Kodde |
| 2015/0124831 | A1 * | 5/2015 | Kumar ................ H04L 12/4633 370/393 |
| 2016/0261430 | A1 | 9/2016 | Lepp et al. |
| 2016/0262182 | A1 | 9/2016 | Yang et al. |
| 2016/0337086 | A1 | 11/2016 | Shen et al. |
| 2017/0005833 | A1 * | 1/2017 | Nishi ................. H04L 12/4641 |
| 2017/0294991 | A1 | 10/2017 | Vincent et al. |
| 2017/0346730 | A1 * | 11/2017 | Menon .................. H04L 45/745 |
| 2018/0183901 | A1 | 6/2018 | Lariviere et al. |
| 2018/0309595 | A1 | 10/2018 | Ma |
| 2018/0338265 | A1 | 11/2018 | Goel et al. |
| 2019/0109822 | A1 | 4/2019 | Clark et al. |
| 2019/0141614 | A1 | 5/2019 | Wang et al. |
| 2019/0188738 | A1 | 6/2019 | Kodde |
| 2019/0268445 | A1 | 8/2019 | Zhang et al. |
| 2019/0363857 | A1 | 11/2019 | Hwang et al. |
| 2020/0045583 | A1 | 2/2020 | Kim |
| 2020/0314009 | A1 | 10/2020 | Goswami et al. |
| 2020/0389835 | A1 | 12/2020 | Talebi Fard |

OTHER PUBLICATIONS

International Search Report and Written Opinion dated Aug. 20, 2020, issued in corresponding International Application No. PCT/US2020/031270, filed May 4, 2020, 16 pages.

International Search Report and Written Opinion dated Sep. 17, 2020, issued in corresponding International Application No. PCT/US020/035683, filed Jun. 2, 2020, 13 pages.

Non-Final Office Action dated Jul. 30, 2020, issued in connection with U.S. Appl. No. 16/889,226, filed Jun. 1, 2020, 17 pages.

Agarwal et al., "Faster FAST: Multicore Acceleration of Streaming Financial Data," Computer Science Research and Development, May 2009, 11 pages, vol. 23.

Declaration of Inventor Under 37 CFR 1.132—Seth Gregory Friedman, filed Jan. 13, 2014 in U.S. Appl. No. 13/633,465, 526 pages (submitted as parts 1 and 2).

Final Office Action dated Nov. 13, 2013, issued in connection with U.S. Appl. No. 13/216,161, 15 pages.

GE Fanuc Intelligent Platforms, "WANic 5860 Packet Processors: Intelligent High-Performance 4-Port Gigabit Ethernet Packet Processor PCI-X Card," Copyright 2008, 2 pages.

Leber et al., "High Frequency Trading Acceleration Using FPGAs," 2011 International Conference on Field Programmable Logic and Applications (FPL), Sep. 2011, 6 pages.

Lockwood et al., "NetFPGA—An Open Platform for Gigabit-rate Network Switching and Routing," IEEE International Conference on Microelectronic Systems Education, Jun. 2007, 2 pages.

Moallemi et al., "The Cost of Latency," Jul. 19, 2011, 49 pages.

Morris et al., "FPGA Accelerated Low-Latency Market Data Feed Processing," 17th IEEE Symposium on High Performance Interconnects, 2009, 7 pages.

Nomura Holdings, Inc., "Nomura Launches Ultra-Low Latency NXT Product Suite in the US," News Release, [online], Nov. 9, 2010. Retrieved from the Internet at <URL: http://www.nomuraholdings.com/news/nr/americas/20101109/20101109.html>, 2 pages.

Non-Final Office Action dated Feb. 6, 2013, issued in connection with U.S. Appl. No. 13/216,161, 9 pages.

Response to Non-Final Office Action filed on Aug. 2, 2013, in connection with U.S. Appl. No. 13/216,161, 11 pages.

Response to Restriction Requirement and Preliminary Amendment filed on Oct. 23, 2012, in connection with U.S. Appl. No. 13/216,161, 11 pages.

Restriction Requirement dated Aug. 23, 2013, issued in connection with U.S. Appl. No. 13/216,161, 6 pages.

Sadoghi et al., "Efficient Event Processing Through Reconfigurable Hardware for Algorithmic Trading," Proceedings of the VLDB Endowment, 2010, 4 pages, vol. 3, No. 2.

The Tabb Group, LLC, "The Value of a Millisecond: Finding the Optimal Speed of a Trading Infrastructure," Copyright 2008, 17 pages.

Cut-Through and Store-and-forward Ethernet Switching for Low-Latency Environments, Cisco Systems, Inc., 2008.

Kermani and Kleinrock, Virtual Cut-through: A New Computer Communication Switching Technique, North-Holland Publishing Company. Computer Networks 3, 1979, pp. 267-286.

Haas, The IEEE 1355 Standard: Developments, Performance and Application in High Energy Physics, Doctoral Thesis, University of Liverpool, Dec. 1998.

Extended European Search Report issued in European Application No. 20866627.1, dated May 6, 2022, 8 pages.

Extended European Search Report issued in European Application No. 20801967.9, dated Apr. 21, 2022, 7 pages.

Final Office Action, issued in connection with U.S. Appl. No. 17/090,592, dated Apr. 4, 2022, 8 pages.

Non-Final Office Action, U.S. Appl. No. 17/090,591, dated Oct. 22, 2021, 15 pages.

* cited by examiner

700

| ID | Source | Name | Description |
|---|---|---|---|
| Network Message Data | | | |
| D001 | M | SeqNum | Extract: Network Protocol Message Sequence Number |
| D002 | M | MsgType | Extract: Network Protocol Message Type |
| D003 | B | MsgState | Retrieve: Current State Valid Network Message State(s) |
| D004 | B | MessageHistoryBuffer | Retrieve: Same Message Buffer |
| D005 | B | AuthorizedConnectionList | Retrieve: Allowed Source IP/Port to Destination IP/Port Mapping |
| Application Message Data | | | |
| D006 | M | SeqNum | Extract: Application Protocol Message Sequence Number |
| D007 | M | MsgType | Extract: Application Protocol Message Type |
| D008 | B | MsgState | Retrieve: Current State Valid Application Message State(s) |
| D009 | B | MessageHistoryBuffer | Retrieve: Same Message Buffer |
| D010 | B | AuthorizedConnectionList | Retrieve: Allowed Logical Connection List |
| Order Message Data | | | |
| D011 | M | Side | Extract: Order Message Side |
| D012 | M | Symbol | Extract: Order Message Symbol |
| D013 | M | Price | Extract: Order Message Price |
| D014 | M | Quantity | Extract: Order Message Quantity |
| D015 | M | Type | Extract: Order Message Type |
| D016 | M | Duration | Extract: Order Message Duration |
| D017 | M | TimeInForce | Extract: Order Message Time In Force |
| D018 | M | ParticipantID | Extract: ParticipantID |
| Static/Dynamic/Calculated Data | | | |
| D019 | B | RestrictedSymbolList | LookupTable; LookupValue: Symbol/Broker/RestrictionType |
| D020 | B | ForeignRestrictionList | LookupTable; LookupValue: Symbol/Broker/LimitType/LimitValue |
| D021 | B | CurrentPositionList | LookupTable; LookupValue: Symbol/Broker/Side/Position |
| D022 | B | CurrentAvailabilityList | LookupTable; LookupValue: Symbol/Broker/Availability [Repeat Broker/Availability for N PBs] |
| D023 | B | AvailableCashList | LookupTable; LookupValue: Account/Bank/Balance |
| D024 | B | SymbolList | LookupTable; LookupValue: Symbol/Sector/Scope/Price/Quantity [Populated by Symbol-Specific Rues] |
| D025 | B | OrderBook | LookupTable; LookupValue: Current Symbol-Specific Exchange Order Book [Top (3 or 5?) Levels Retained in Block RAM; Remaining Levels Retained in (QDR or DDR?)] |
| D026 | B | OrderHistoryBuffer | LookupTable; LookupValue: Side/Symbol/Price/Quantity/Type/Duration [X Seconds Retained in Block RAM; Y Seconds Retained in QDR; Z Seconds Retained in DDR] |
| D027 | B | OrderOpenBuffer | LookupTable; LookupValue: Side/Symbol/Price/Quantity/Type/Duration |
| D028 | B | ExchangeStatus | LookupTable; LookupValue: Symbol/TradingStatus |
| D029 | B | ExchangeDelisting | LookupTable; LookupValue: Symbol/DelistingDate |
| D030 | B | ExhchangeDelisted | LookupTable; LookupValue: Symbol/DelistedDate |
| D031 | B | ExchangeEarningsWindow | LookupTable; LookupValue: Symbol/EarningsDate |
| D032 | B | ExchangeRecordDateWindow | LookupTable; LookupValue: Symbol/RecordDate |
| D033 | B | ExchangeCorpActionWindow | LookupTable; LookupValue: Symbol/CorpActionDate |
| D034 | B | SymbolValueBLOpen | LookupTable; LookupValue: Symbol/Value/ExecutionBroker/PrimeBroker |
| D035 | B | SymbolValueBLExecuted | LookupTable; LookupValue: Symbol/Value/ExecutionBroker/PrimeBroker |
| D036 | B | SymbolValueSLOpen | LookupTable; LookupValue: Symbol/Value/ExecutionBroker/PrimeBroker |
| D037 | B | SymbolValueSLExecuted | LookupTable; LookupValue: Symbol/Value/ExecutionBroker/PrimeBroker |
| D038 | B | SymbolValueSSOpen | LookupTable; LookupValue: Symbol/Value/ExecutionBroker/PrimeBroker |
| D039 | B | SymbolValueSSExecuted | LookupTable; LookupValue: Symbol/Value/ExecutionBroker/PrimeBroker |
| D040 | B | SymbolQuantityBLOpen | LookupTable; LookupValue: Symbol/Value/ExecutionBroker/PrimeBroker |
| D041 | B | SymbolQuantityBLExecuted | LookupTable; LookupValue: Symbol/Quantity/ExecutionBroker/PrimeBroker |
| D042 | B | SymbolQuantitySLOpen | LookupTable; LookupValue: Symbol/Quantity/ExecutionBroker/PrimeBroker |
| D043 | B | SymbolQuantitySLExecuted | LookupTable; LookupValue: Symbol/Quantity/ExecutionBroker/PrimeBroker |
| D044 | B | SymbolQuantitySSOpen | LookupTable; LookupValue: Symbol/Quantity/ExecutionBroker/PrimeBroker |
| D045 | B | SymbolQuantitySSExecuted | LookupTable; LookupValue: Symbol/Quantity/ExecutionBroker/PrimeBroker |
| D046 | B | SymbolOrderResTimeBL | LookupTable; LookupValue: Symbol/CalculationResult |
| D047 | B | SymbolOrderResTimeSL | LookupTable; LookupValue: Symbol/ CalculationResult |
| D048 | B | SymbolOrderResTimeSS | LookupTable; LookupValue: Symbol/ CalculationResult |
| D049 | B | SymbolVenueExecutedValue | LookupTable; LookupValue: Symbol/TotalExchangeExecutedValue |
| D050 | B | SymbolVenueExecutedQuantity | LookupTable; LookupValue: Symbol/TotalExchangeExecutedQuantity |
| D051 | B | SendAuthStabilization | LookupTable; LookupValue: Sender/Symbol/Stabilization.Flag |
| D052 | B | SendAuthBuyBack | LookupTable; LookupValue: Sender/Symbol/BuyBack.Flag |
| D053 | B | SendAuthPublicPolicy | LookupTable; LookupValue: Sender/Symbol/PublicPolicy.Flag |
| D054 | B | SymbolValueStdDev | LookupTable; LookupValue: Symbol/TradingSegment/ValueStdDev |
| D055 | B | SymbolQuantityStdDev | LookupTable; LookupValue: Symbol/TradingSegment/QuantityStdDev |
| D056 | B | SymbolVenueOpenValue | LookupTable; LookupValue: Symbol/TotalExchangeExecutedValue |
| D057 | B | SymbolVenueOpenQuantity | LookupTable; LookupValue: Symbol/TotalExchangeExecutedQuantity |

FIG. 7

| ID | CP Name | Formula | Description | SE | EB | PB | Rewrite | Reject | Alert |
|---|---|---|---|---|---|---|---|---|---|
| Message Integrity - Network | | | | | | | | | |
| Y | ValidSeqNum | IsValid? D001 | Validate network protocol sequence number. | Y | | | | | |
| Y | ValidMsgType | IsValid? D002 IN D003 | Validate message type is valid given current network state. | Y | | | Y | Y | Y |
| Y | RepeatMessage | IsRepeat? MsgData = MsgData in N Messages in X Seconds | Validate whether message is repeat and if so whether limit is exceeded. | Y | | | | N/A | Y |
| Message Integrity - Application | | | | | | | | | |
| Y | ValidSeqNum | IsValid? D006 | Validate application protocol sequence number. | Y | | | Y | N/A | Y |
| Y | ValidMsgType | IsValid? D007 IN D008 | Validate message type is valid given current application state. | Y | | | | Y | Y |
| Y | RepeatMessage | # Same Messages in X Seconds | Validate whether message is repeat and if so whether limit is exceeded. | Y | | | | Y | Y |
| Message Integrity - Order | | | | | | | | | |
| Y | ValidOrder | Exist? Minimum Required Parameters. | Validate order message contains minimum required parameters and that all are valid. | Y | | | | Y | Y |
| Y | ValidSymbol | Exist? Valid Symbol | Validate order message contains valid symbol. | Y | | | | Y | Y |
| Y | ValidPrice | Exist? Valid Price | Validate order message contains valid price. | Y | | | | Y | Y |
| Y | ValidQuantity | Exist? Valid Quantity | Validate order message contains valid quantity. | Y | | | | Y | Y |
| Y | BlockedSymbol | Exist? Symbol Blocked | Validate symbol is tradable. | Y | Y | | | | Y |
| Y | ForeignRestriction | Foreign Ownership Restricted? | Validate symbol not applicable to Foreign Ownership Limits. | Y | | | | | Y |
| Y | ForeignLimitAction | If Restricted Apply Rule and Action | If Foreign Ownership Limits applicable, apply rule. | Y | Y | | | Y | Y |
| Y | ParticipantID | Exist? ParticipantID | Validate order message contains valid ParticipantID. | Y | | | | Y | Y |
| Y | Prop/Agency Flag | Exist? Prop/Agency Flag | Validate order message contains valid Prop/Agency Flag... | Y | | | | Y | Y |

FIG. 8A

| ID | CP Rule | Formula | Description | SE | EB | PB | Rewrite | Reject | Alert |
|---|---|---|---|---|---|---|---|---|---|
| Entity Integrity – Risk Mitigation | | | | | | | | | |
| N | AlertCorpAction | Exception? D033 = TRUE | Checks for active corporate action and whether there is an intersection with 1) an existing position; or 2) a newly active security. | Y | | | | | Y |
| N | AlertDelisting[*] | Exception? D030 = TRUE | Checks whether active delisting exists and whether there is an intersection with 1) an existing position; or 2) a newly active security. | Y | Y | Y | | | Y |
| N | AlertEarnings | Exception? D031 = TRUE | Checks whether within earnings window (X days) and whether there is an intersection with 1) an existing position; or 2) a newly active security. | Y | | | | | Y |
| N | AlertRecordDate | Exception? D032 = TRUE | Checks whether within record date window (X days) and whether there is an intersection with 1) an existing position; or 2) a newly active security. | Y | Y | | | | Y |
| N | AlertTradeHalt[*] | Exception? D028 = HALT OR D028 = RESUME | Checks whether there is a trade halt and whether there is an intersection with 1) an existing position; or 2) a newly active security. | Y | | | | | Y |
| N | AlertTradeRestriction[*] | Exist? | Checks whether there is a trade restriction and whether there is an intersection with 1) an existing position; or 2) a newly active security. | Y | Y | | | Y | Y |
| Y | AucAmCloseQuantitySymbol[*] | Exception? (D014) > (AmCloseStdDevQty * X) | Checks whether order quantity exceeds THRESHOLD. | Y | Y | | | Y | Y |
| Y | AucAmCloseValueSymbol[*] | Exception? (D013*D014) > ((AmCloseStdDevQty * X) * MarketPrice [IF NOT EXISIT] PreviousClose) | Checks whether order value exceeds THRESHOLD. | Y | Y | | | Y | Y |
| Y | AucAmOpenQuantitySymbol[*] | Exception? (D014) > (AmOpenStdDevQty * X) | Checks whether order quantity exceeds THRESHOLD. | Y | Y | | | Y | Y |
| Y | AucAmOpenValueSymbol[*] | Exception? (D013*D014) > ((AmOpenStdDevQty * X) * PreviousClose) | Checks whether order value exceeds THRESHOLD. | Y | Y | | | Y | Y |
| Y | AucPmCloseQuantitySymbol[*] | Exception? (D014) > (PmCloseStdDevQty * X) | Checks whether order quantity exceeds THRESHOLD. | Y | Y | | | Y | Y |
| Y | AucPmCloseValueSymbol[*] | Exception? (D013*D014) > ((PmCloseStdDevQty * X) * MarketPrice [IF NOT EXISIT] PreviousClose) | Checks whether order value exceeds THRESHOLD. | Y | Y | | | Y | Y |

FIG. 8B

MESSAGE VALIDATION USING DATA-LINK LAYER FIELDS

CROSS-REFERENCE TO RELATED APPLICATIONS

This application is a continuation of and claims priority to U.S. patent application Ser. No. 16/952,773, filed Nov. 19, 2020, which is hereby incorporated by reference in its entirety.

U.S. patent application Ser. No. 16/952,773 is a continuation of and claims priority to U.S. patent application Ser. No. 16/864,447, filed May 1, 2020, which is hereby incorporated by reference in its entirety.

U.S. patent application Ser. No. 16/864,447 claims priority to U.S. provisional patent application No. 62/843,678, filed May 6, 2019, which is hereby incorporated by reference in its entirety.

BACKGROUND

Data-link layer fields, such as Institute of Electrical and Electronics Engineers (IEEE) 802.1Q and 802.1ad Ethernet fields containing virtual local area network (VLAN) tags, are fixed-length bit strings that can be inserted into the header of an Ethernet frame without impacting the frame's payload. Thus, VLAN tags may be added or removed from a frame as desired. These tags allow a local area network (LAN) to be logically subdivided into multiple VLANs, as well as allow trunking or bridging between LANs. The 802.1Q standard permits one tag per frame, while the 802.1ad standard explicitly permits two tags per frame and in principle supports a larger number of tags per frame so long as the ultimate size of the frame does not exceed what is supported by the transmitting and receiving hardware.

SUMMARY

While such data-link layer fields have been widely deployed for their intended, traditional uses, there are advantages to using these fields to encode other types of information. As just one example, data-link layer fields can be used to encode or represent some or all of the information that is also being transported within the payload of the frame. This allows the type of any higher-layer packet therein to be rapidly identified and validated. Further, any transaction within the payload can be encoded within the tags so that the type and nature of the transaction can be rapidly identified and validated.

The embodiments herein involve a device or module receiving data-link layer frames with one or more data-link layer fields as described herein, carrying out a number of checks or other validations on these fields based on pre-established rules, and determining therefrom whether the frames represent valid transactions. These operations may be performed by dedicated hardware, such as a network interface card, an application-specific integrated circuit (ASIC), a field-programmable gate array (FPGA), or some form of m×n switching device or module where m and n are expected to be 2 or more (e.g., 2, 4, 8, 16), but could be 1. Alternatively, any other type of reprogrammable or fixed-logic integrated circuit may be used.

Notably, the device may employ cut-through routing rather than store-and-forward routing. This means that the initial bits of the frame may be processed while other bits of the frame are still being received, and that the transmission of already-received bits begins after being processed while other bits of the frame are still being received. Such cut-through routing is efficient and reduces routing delay, but also narrows the time window in which decisions on how to process the frame (forward, delay, or discard) can be made. Thus, by placing key information in data-link layer fields, the device can carry out these decisions at line speed even on high-speed networks, such as 10 gigabit per second (Gbps) Ethernet.

To that end, the device may carry out the rules on the information within data-link layer fields in real time. In the case of packet types, transaction types, or transaction attempts that violate one or more of the rules, the frame may be discarded (e.g., deleted or not forwarded on to its intended next hop destination). Alternatively, a bit in either the payload or the frame check sequence may be changed (or "flipped") from 0 to 1 or vice-versa, thus corrupting the frame by causing the frame check sequence to fail upon receipt of the frame by its next hop destination.

These embodiments are particularly advantageous for certain types of networked environments or transactions in which the types and formats of frame payload are limited. For instance, in certain manufacturing, financial, and scientific computing applications, only a handful (e.g., a few dozen or less) of these types and formats may be in use. Thus, any frame not adhering to one such type or format is considered suspicious and may be discarded, logged, or flagged for further analysis. In this fashion, the embodiments herein provide a form of application-specific firewall function without the complexity of a traditional general-purpose firewall, and at a significantly higher rate in terms of frame-per-second processing.

Further, in these application-specific scenarios, higher layer protocols may encrypt at least some of the data-link layer payload. The embodiments herein allow information about the encrypted parts of the payload to be encoded in the data-link layer fields, eliminating the need for decryption of the payloads to carry out checks on payload content. But if it is desirable for the rules to verify that the representation in the data-link layer fields matches the encrypted portion of the payload, a chosen-plaintext analysis of the limited number of payload types and formats can be carried out. Thus, the payload can be decrypted and compared to the representation in the data-link layer. Any discrepancy between the two can be grounds for discarding or corrupting the frame.

Accordingly, a single, high-speed device can perform validation of data-link layer frames and any transactions therein at line speed (e.g., with 1 microsecond or less latency). Such a capability can be useful across various applications and industries.

A first example embodiment may involve a device. The device may include a first interface communicatively coupled to a source system and a second interface communicatively coupled to a destination system. The device may also include memory containing a set of rules and representations of pre-defined violations thereof. The device may also include digital logic programmed to: (i) receive, by way of the first interface and from the source system, an Ethernet bitstream defining an Ethernet frame, the Ethernet frame containing Ethernet header fields and an Ethernet payload, wherein a destination Ethernet address within the Ethernet header fields specifies the destination system, wherein the Ethernet payload contains an Internet Protocol (IP) packet with IP header fields and an IP payload, and wherein the IP payload contains a transport-layer segment containing transport-layer header fields and a transport-layer payload; (ii) extract data from the Ethernet header fields, wherein the data defines a transaction that is functionally equivalent to a further transaction that is defined by one or more of the IP header fields, the transport-layer header fields, or the transport-layer payload; (iii) apply the set of rules to the transaction, wherein applying the set of rules involves comparing one or more fields in the data to one or more values stored in the memory and concluding that the transaction contains one of the pre-defined violations; (iv) based on concluding that the transaction contains one of the pre-defined violations, determine that the transaction is invalid; and (v) based on the transaction being invalid, refrain from forwarding the Ethernet frame to the destination system.

A second example embodiment may also involve a device. The device may include a first interface communicatively coupled to a source system and a second interface communicatively coupled to a destination system. The device may also include memory containing a set of rules and representations of pre-defined violations thereof. The device may also include digital logic programmed to: (i) receive, by way of the first interface and from the source system, an Ethernet bitstream defining an Ethernet frame, the Ethernet frame containing Ethernet header fields and an Ethernet payload, wherein a destination Ethernet address within the Ethernet header fields specifies the destination system, wherein the Ethernet payload contains an IP packet with IP header fields and an IP payload, and wherein the IP payload contains a transport-layer segment containing transport-layer header fields and a transport-layer payload; (ii) extract data from the Ethernet header fields, wherein the data defines a transaction that is functionally equivalent to a further transaction that is defined by one or more of the IP header fields, the transport-layer header fields, or the transport-layer payload; (iii) apply the set of rules to the transaction, wherein applying the set of rules involves comparing one or more fields in the data to one or more values stored in the memory and concluding that the transaction does not contain any of the pre-defined violations; (iv) based on concluding that the transaction does not contain any of the pre-defined violations, determine that the transaction is valid; and (v) based at least in part on the transaction being valid, modify the Ethernet frame to form a further Ethernet frame containing content based on the transport-layer payload, and transmit the further Ethernet frame to the destination system.

Further embodiments may include procedures carried out by computing devices in accordance with the first and/or second example embodiments, as well as a computer-readable medium containing program instructions that, when executed, carry out operations of the first and/or second example embodiments.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 is a table of data sources, in accordance with example embodiments.

FIGS. 8A and 8B are a table of rules, in accordance with example embodiments.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Example Network Device

The following embodiments describe architectural and operational aspects of example computing devices and systems that may employ the disclosed implementations, as well as the features and advantages thereof.

Figure 1A:
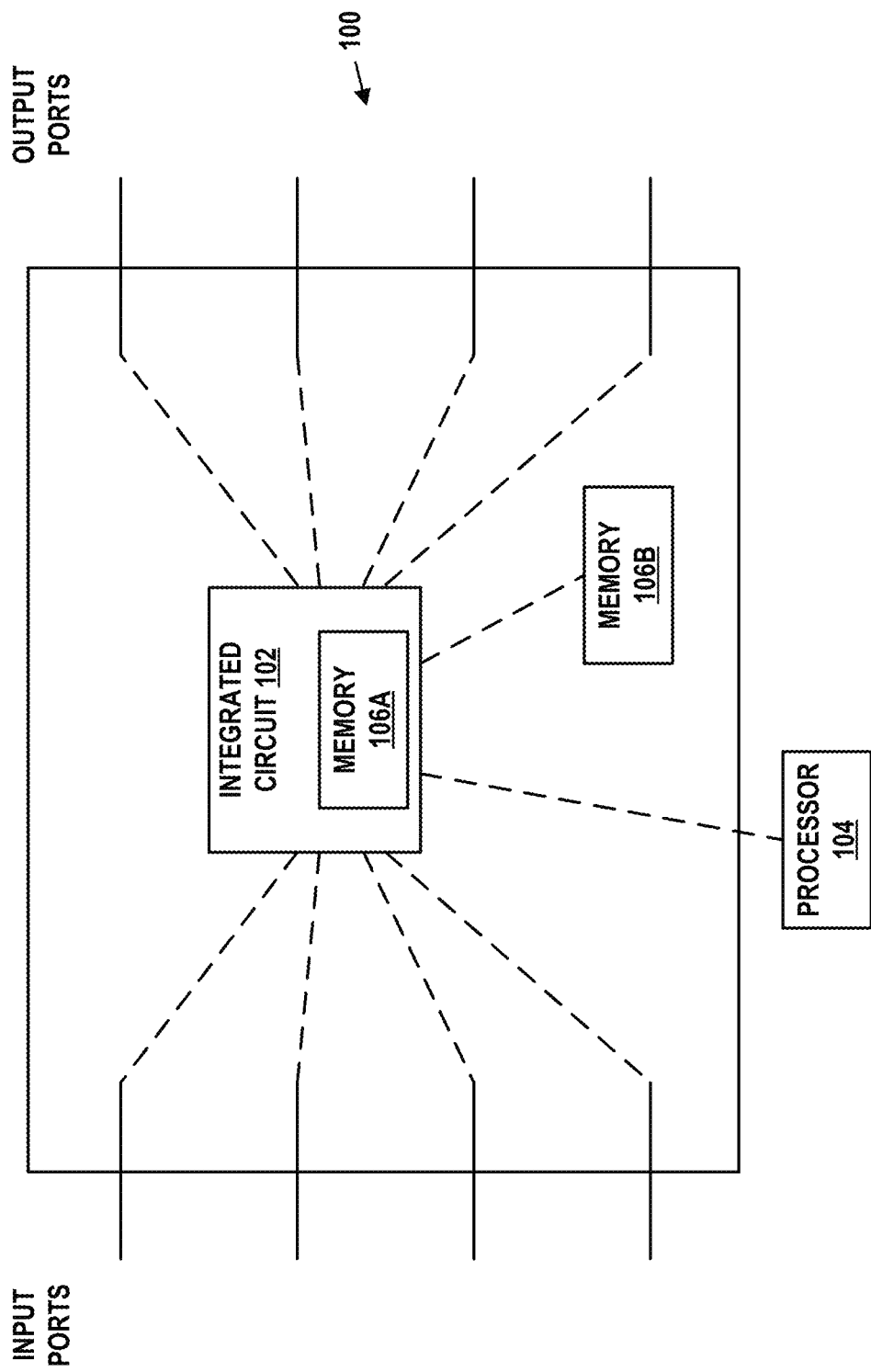
FIG. 1A is a schematic drawing of a switching device, in accordance with example embodiments.

FIG. 1A is a simplified block diagram exemplifying a device 100, illustrating some of the components that could be included in a switching device arranged to operate in accordance with the embodiments herein. In this example, the switching device may include a number of input ports and a number of output ports connected by an integrated circuit 102. A processor 104 and memory units 106A and 106B may also be connected to the integrated circuit. Notably, integrated circuit 102, memory 106A and memory 106B may be disposed upon a printed circuit board (PCB) while processor 104 is not on the PCB but accessible to the components on the PCB by way of the input ports and/or output ports.

The input ports and output ports may be, for example, Ethernet ports (e.g., 100 Mbps Ethernet, 1 Gbps Ethernet, 10 Gbps Ethernet, 40 Gbps Ethernet, 100 Gbps Ethernet, etc.). Thus, each of these ports may be able to receive and couple to an Ethernet cable and communicate thereby. Each of these ports may also be connected to integrated circuit 102, thus forming an m×n switching matrix, wherein frames received by any input port can be routed to any output port. In FIG. 1A, four input ports and four output ports are shown, but the embodiments herein may support different numbers of input and output ports. In some embodiments, other types of data-link layer ports or interfaces, such as Token Ring, SONET, Wifi, etc. could be used instead.

In an alternative embodiment, either the input ports or the output ports may be replaced by one or more peripheral component interconnect express (PCIe) interfaces. Such interfaces can be used to plug device 100 into a PCIe bus of a chassis for example. In yet another alternative, any of the input ports or output ports could be Wifi interfaces.

Integrated circuit 102 may be any type of ASIC, FPGA, digital circuit, microprocessor, network processor, etc. As shown, integrated circuit 102 may be able to receive frames from the input ports and carry out various operations on these frames, and then provide them to the output ports. In some embodiments, bidirectional traffic between input and output ports may be supported. Further, operations conducted on the frames may involve adding or removing data-link layer fields modifying any part of the frames, and/or discarding the frames. In operation, integrated circuit 102 may access information in the memory, such as rules to apply when validating or modifying the frames.

Processor 104 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 104 may be one or more single-core processors. In other cases, processor 104 may be one or more multi-core processors with multiple independent processing units. Processor 104 may also include register memory for temporarily storing instructions being executed and related data, as well as cache memory for temporarily storing recently-used or pre-fetched instructions and data.

Processor 104 may be off-board (as shown) and used for management. In the case of FIG. 1A, device 100 may communicate with processor 104 via the input ports or the output ports (e.g., Ethernet, PCIe, or Wifi). Nonetheless, device 100 may be integrated with or communicatively coupled to other processors that contributed to the operations described herein.

Memory 106A and 106B may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples. Device 100 may include fixed memory as well as one or more removable memory units, the latter including but not limited to various types of secure digital (SD) cards. Thus, memory 106A and 106B represent main memory units, as well as long-term storage. Other types of memory may include biological memory. As shown, memory 106A is on-chip (i.e., part of integrated circuit 102) while memory 106B is off-chip but on-board (i.e., not part of integrated circuit 102 but on the same PCB). Other arrangements are possible.

Memory 106A and/or 106B may store program instructions and/or data on which program instructions may operate. By way of example, memory 106A and/or 106B may store these program instructions on a non-transitory, computer-readable medium, such that the instructions are executable by the integrated circuit and/or processor to carry out any of the methods, processes, or operations disclosed in this specification or the accompanying drawings.

Not shown in FIG. 1A is any sort of input/output unit that may facilitate user and peripheral device interaction with device 100. This unit may include one or more types of input devices, such as a keyboard, a mouse, a touch screen, and so on. Similarly, this unit may include one or more types of output devices, such as a screen, monitor, printer, and/or one or more light emitting diodes (LEDs). Additionally or alternatively, device 100 may communicate with other devices using a form of PCI bus, universal serial bus (USB), high-definition multimedia interface (HDMI) port interface for example, or via Ethernet ports to management console (s).

Figure 1B:
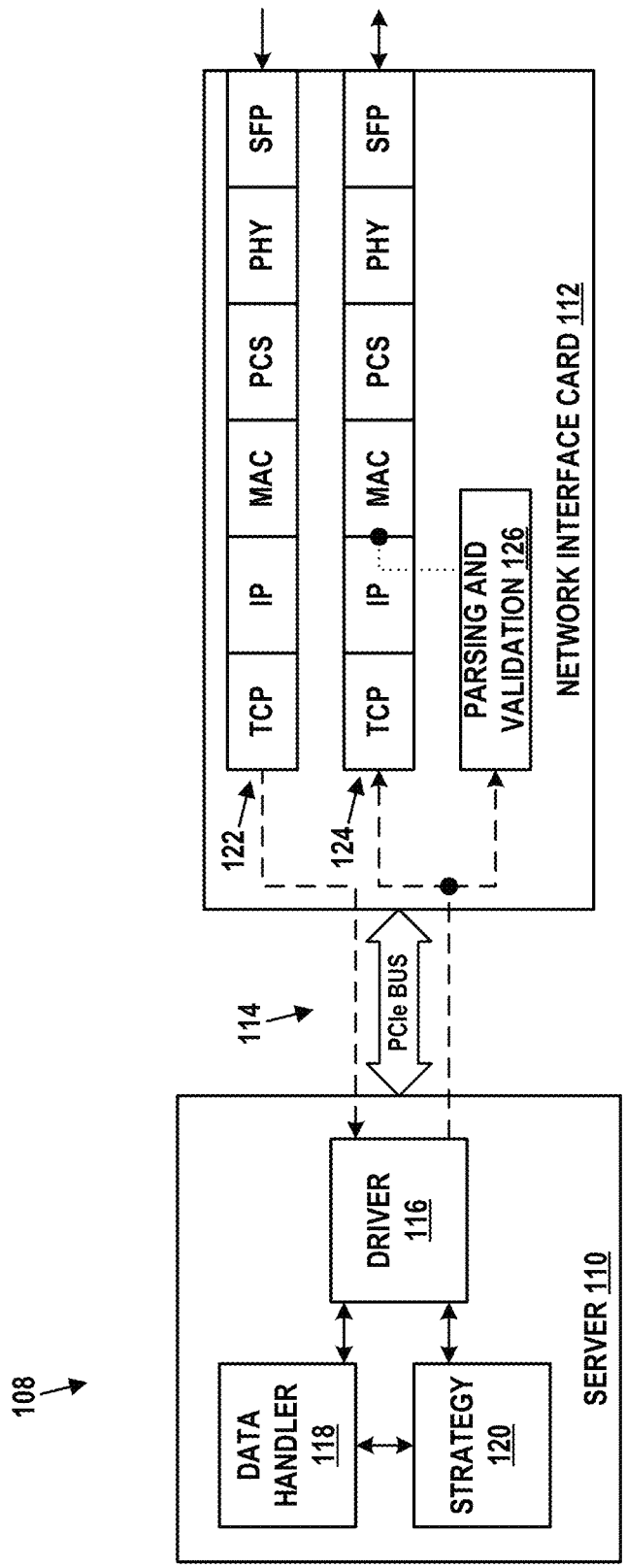
FIG. 1B is a schematic drawing of a network interface card, in accordance with example embodiments.

In some embodiments, device 100 may be implemented as a single-port or multi-port network interface card that can be plugged into or integrated with a chassis and/or motherboard of a computational device. To that point, FIG. 1B provides a schematic of such an arrangement.

Notably, device 108 (which may be considered to be a specific embodiment or variation of device 100) includes server module 110 and network interface card 112 connected by PCIe bus 114. Server module 110 may be implemented at least in part on general purpose computing hardware or custom hardware. Driver module 116 may be software that serves as an interface to PCIe bus 114. Data handler module 118 and strategy module 120 may be software that processes the headers and/or payloads of packets received by way of network interface card 112, and also provides data for packetization and transmission by network interface card 112.

Network interface card 112 may include network protocol stacks 122 and 124, as well as parsing and validation module 126. Each of network protocol stacks 122 and 124 may include modules for processing Transmission Control Protocol (TCP) headers, Internet Protocol (IP) headers, medium-access control (MAC) headers such as Ethernet headers, as well as the physical coding sublayer (PCS) physical layer (PHY), and small form-factor pluggable (SFP) transceiver of an interface. These protocol stacks may be arranged to be able to support both transmission and reception of frames, though in FIG. 1B protocol stack 122 is shown only receiving frames while protocol stack 124 is shown transmitting and receiving frames. In some embodiments, protocol stacks 122 and 124 represent the inbound and outbound processing of the same protocol stack.

Parsing and validation module 126 may be configured to read and perform rule-based validation checks on representations of transactions that are placed in 802.1Q fields. This functionality will be described on more detail below. As shown, parsing and validation module 126 may effectively operate between the IP and MAC layer processing of incoming or outgoing packets. Alternatively, parsing and validation module 126 may be part of the MAC layer processing.

In some embodiments, network interface card 112 may be a standalone module, such as an ASIC, FPGA, or one or more other hardware units or combinations thereof. Thus, the components and/or functionality of server 110 need not be present for network interface card 112 to be able to operate in accordance with the disclosure herein. Further, network interface card 112 may include one or more units of memory that can be used to store program instructions and/or data.

In general, device 100 and/or network interface card 112 may be arranged in various embodiments that can carry out some combination of Open Systems Interconnection (OSI) layer 1, 2, 3, and 4 parsing and analysis functions. Thus, the embodiments herein could be performed by devices and systems that vary in design from device 100 and network interface card 112. For sake of convenience, the term "device 100" will be used below to refer to any of these embodiments, including but not limited to those of FIGS. 1A and 1B.

II. Example Ethernet Frames and 802.1Q Fields

Figure 2:
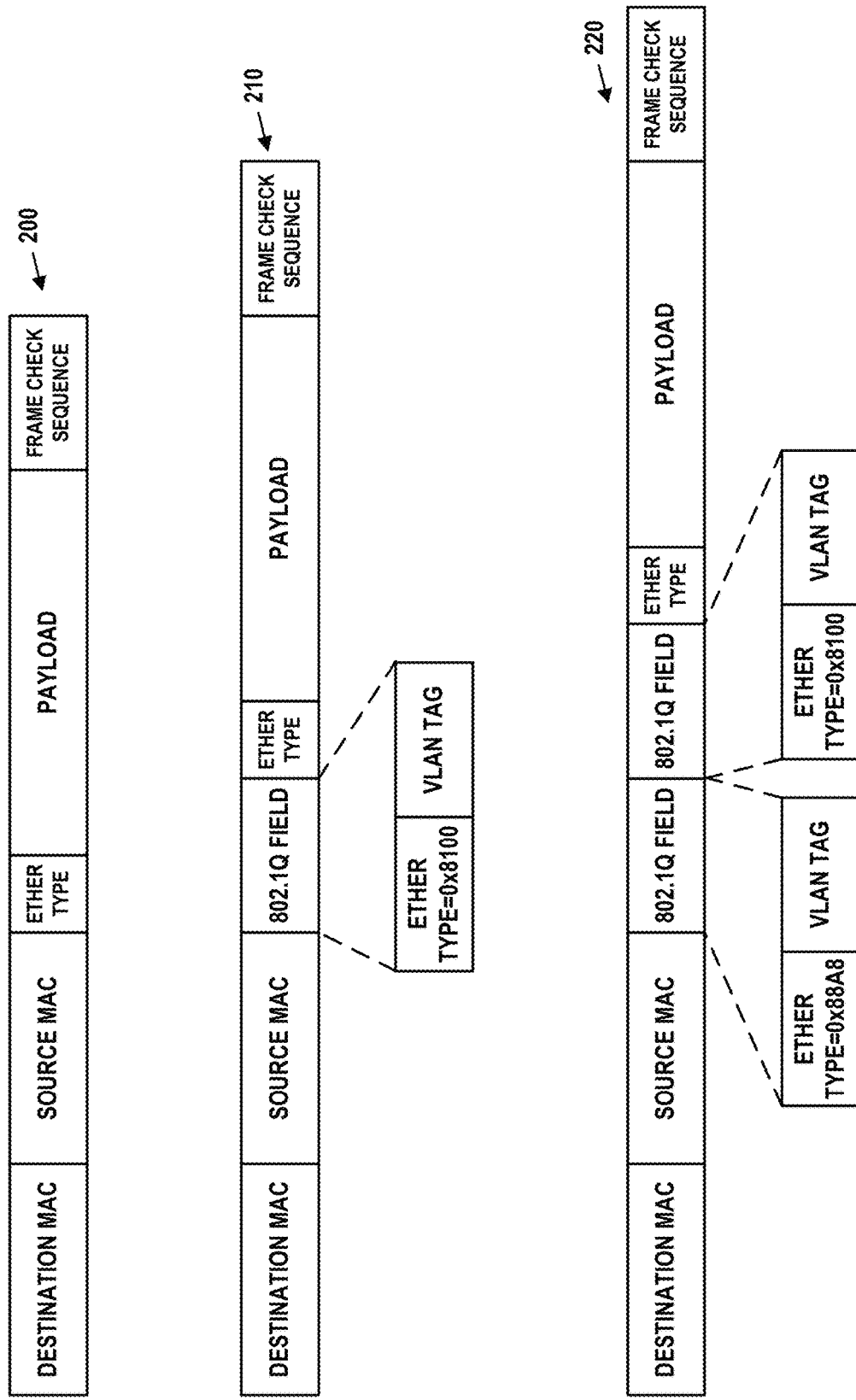
FIG. 2 illustrates data-link layer frame formats, in accordance with example embodiments.

FIG. 2 depicts three examples of Ethernet frames. Frame 200 does not contain any 802.1Q fields, while frame 210 contains one such field and frame 220 contains two of these fields.

Frame 200 is a standard Ethernet frame appearing left to right as it would be transmitted from one point and received at another point. Thus, the destination MAC field would be transmitted first and the frame check sequence would be transmitted last.

The destination MAC address field may contain a 6-byte Ethernet destination address (e.g., 08-16-a2-4c-bb-02). Similarly, the source MAC address field may contain a similarly formatted 6-byte Ethernet source address. The ethertype field indicates the type of payload that frame 200 encapsulates. If this is an IP packet, the ethertype is 0x0800.

After the payload (which may be variable length), there is a 4-byte frame check sequence (FCS). The value of the FCS is based on an error checking sequence run over the length of the frame but excluding the FCS bits. The FCS field contains a number that is calculated by the transmitting entity based on the data in the frame. Thus, the transmitting entity calculates the FCS and stores it in the FCS field. When the frame is received, the receiving entity recalculates the FCS and compares it with the FCS value included in the frame. If the two values are different, an error is assumed and the frame is typically discarded.

Frame 210 contains all fields of frame 200, but also a 4-byte 802.1Q field disposed between the source MAC field and the ethertype field. The 802.1Q field contains a 2-byte ethertype field of 0x8100 indicating that this is an 802.1Q field, as well as a 2-byte VLAN tag field which can take on various values. Notably, when an 802.1Q field is added to or removed from a frame, the FCS is recalculated accordingly.

Frame 220 contains all of the fields of frame 210, but also a second 4-byte 802.1Q field disposed between the source MAC field and the previous 802.1Q field. The second 802.1Q field contains a 2-byte ethertype field of 0x8A88 indicating that this is a second 802.1Q field, as well as a 2-byte VLAN tag field which can take on various values.

Although it is not shown in FIG. 2, the VLAN tag portion of an 802.1Q field may consists of 12 or 16 bits. Traditionally, the VLAN tag was 12 bits in length with the other four bits in the 802.1Q field aside from the ethertype being used for designated purposes.

But since the embodiments herein utilize tagging in an unconventional fashion, it may be possible to use all 32 bits in each 802.1Q field. For example, an 802.1Q field may define a transaction. Thus, these embodiments can use between 32 and 64 bits for transaction encoding when two 802.1Q fields are present.

Further, it may be possible to include more than two 802.1Q fields in a single Ethernet frame. In these cases, at least the VLAN tag portions of each may be used for transaction encoding. Arrangements of multiple 802.1Q fields may be in accordance with the IEEE 802.1ad standard, but will be referred to as 802.1Q fields herein.

Not shown in FIG. 2 are the 56-bit (7-byte) Ethernet preamble and 8-bit (1-byte) start frame delimiter (SFD) that precedes the destination MAC address field. Thus, in practice, the 802.1Q field may begin after 8 bytes of preamble and SFD, 6 bytes of destination MAC address, and 6 bytes of source MAC address. This means that the first 802.1Q field may begin at the 21st byte (161st bit) of the frame.

Without limitation, the 802.1Q fields described herein may be referred to as "proprietary" or "non-standard" fields or headers when they deviate from the standard 802.1Q formats.

III. Example Transaction Encoding

The embodiment described in this section provides encodings of operations that device 100 can be perform on frames. The following sections expand upon these embodiments with more detail and alternative techniques.

Figure 3:
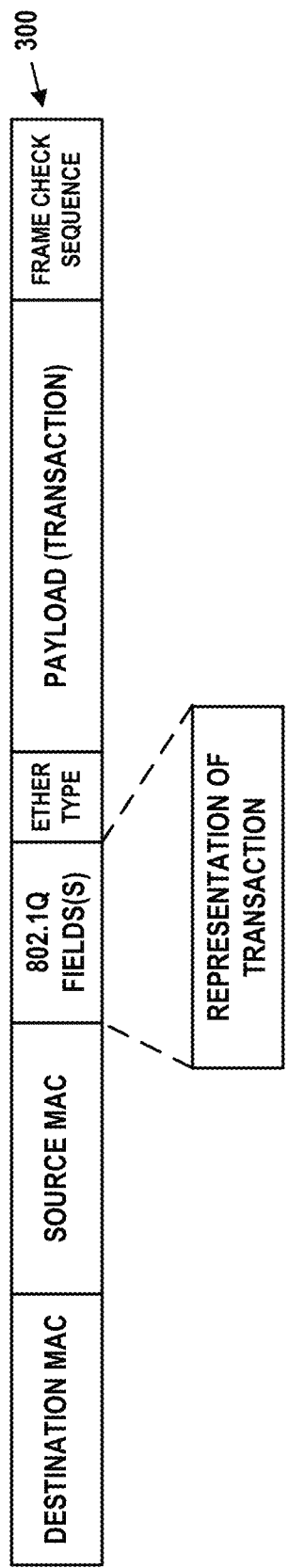
FIG. 3 illustrates representing transactions in one or more fields of a data-link layer frame, in accordance with example embodiments.

As noted above, rapid processing of frames may be facilitated by placing encoded representations of transactions in the spare bits of one or more 802.1Q fields. An example frame format is shown in FIG. 3.

Frame 300 includes a transaction in its payload. The payload of frame 300 may contain, for example, an IP packet which in turn encapsulates a TCP segment. The payload of the TCP segment may include a representation of a transaction. This transaction may be in various encodings, such as text (e.g., XML, or JSON), binary, or key-value pairs. Further, a representation of the transaction may be placed in one or more 802.1Q fields. This representation may be a full version of the transaction or a condensed version of the transaction with enough information to determine the type and nature of the transaction. Thus, binary encodings may be used for efficiency, but other types of encodings may be used alternatively.

Example types of transactions vary, but in one example can include machine control transactions. For instance, suppose that a simple manufacturing device has six possible commands—start, stop, move left, move right, move up, and move down. These six commands may be encoded in a text format in the frame's payload, but with only three bits in the 802.1Q fields.

Device 100, receiving such a command, may check the values of the three bits to ensure that a valid command is encoded in the representation. This may ensure that only frames with valid commands are transmitted on to the next hop device (which may or may not be the destination device). Any other frame may be discarded or corrupted (e.g., by flipping a payload or FCS bit) so that it is discarded by the next hop device.

In some embodiments, device 100 may keep track of multiple frames from a sender to check whether these frames in aggregate violate a rule or policy. This may involve using memory 106A and/or 106B to store state and an off-board processor to perform higher-level calculations. Alternatively, this memory and processing may be part of network interface card 112.

For example, the simple manufacturing device may be restricted so that it can move in any one direction no more than 3 times in a row. In this case, device 100 may do one of three things: (i) perform these higher level checks or send the frame to a processor for performance of the checks, (ii) forward the frame toward its ultimate destination, but also perform these higher level checks or send the frame to a processor for performance of the checks, or (iii) discard the frame.

In the first case, a determination may be made whether to discard or corrupt the frame if it fails the higher-layer checks, or forward the frame toward its ultimate destination if the frame passes the higher-layer checks. In the second case, if the frame passes the checks, the copy may be discarded. But if the frame fails these checks, one or both of the following may be carried out: generating a frame containing a payload that cancels the action of the initial frame that was already forwarded, or disabling the input port through which the initial frame was received from being able to receive any more transactions. In the third case, the frame is discarded without any higher-level checks or forwarding.

The higher-level checks may involve finding a field in a plurality of fields encoded in the payload. This field may be associated with a starting bit location and an ending bit location, and field extractor logic may be programmed to obtain the field based on the starting bit location and the ending bit location. The starting and ending bit locations may be fixed or variable. Multiple fields can be found in this fashion.

Another type of transaction may be a financial transaction. The payload of the data may contain an instruction to either buy or sell, a name of a security to be bought or sold, and a number of units of that security to be bought or sold. Given that the number of securities supported by a given exchange and the number of units per transaction are usually limited to a few thousand at most, this information can be efficiently encoded in the bits of two or more 802.1Q fields.

units represented in binary. These units may be either individual securities or lots of two or more. The Px.P field indicates whether the transaction is for a negative or positive number of units. Certain types of asset classes (e.g., futures) in certain exchanges may be specified by convention with a negative price. Thus, this field may represent an arithmetic sign, plus or minus. The Px.L field indicates the portion of the price of the security that is to the left of the decimal point, and the Px.R field indicates the portion of this price that is to the right of the decimal point.

In alternative embodiments, different numbers of bits may be used to encode these fields. For example, 7 bits could be used to encode the Px.R so that two digits to the right of the decimal can be represented.

As a concrete instance, a transaction involving the long purchase of 100 units of the security ABC Corp., which has a price of $32.40 per unit may be encoded as follows. The Sy field may encode the ticker symbol of ABC Corp. or some other representation thereof (e.g., a unique numerical representation). Since there are 17 bits in the Sy field, $2^{17}=131,072$ different securities can be referenced in this fashion. The Side field may take on a value of 00. The Qt field may encode the value of 100 in binary. The Px.P field may have a value of 1 indicating a positive number of units. The Px.L field may encode 32 in binary and the Px.R field may encode 4 as binary.

Notably, the embodiment and example shown above is just one possibility. Other encoding arrangements may exist. For instance, different trading exchanges and different asset classes could have different encodings within the bits of one or more 802.1Q fields.

Device 100 may check the representation of the transaction against one or more per-transaction rules stored in the memory. These rules may be, for example, that no more than a certain number of units of a certain security can be purchased in a single transaction. Device 100 may ensure that frames with valid transactions are transmitted on to the destination device. Any other frame may be discarded or

TABLE 1

| FieldName | FieldLength | PosStart | PosEnd | Rules | Description |
|---|---|---|---|---|---|
| Sy | 17 | 161 | 177 | Value Transmitted as Binary | Symbol |
| Si | 2 | 178 | 179 | BL = 00; BC = 01; SL = 10; SS = 11 | Side |
| Qt | 20 | 180 | 199 | Quantity Transmitted as Binary | Quantity |
| Px.P | 1 | 200 | 200 | <0 = 0; >0 = 1 | Positive/negative indicator |
| Px.L | 20 | 201 | 220 | Value Transmitted as Binary | Price (left of decimal) |
| Px.R | 4 | 221 | 224 | Value Transmitted as Binary | Price (right of decimal) |

For example, the structure in Table 1 represents an encoding of the components of a securities order with the 64 bits of a pair of 802.1Q fields. In alternative embodiments, such as those shown in FIG. 1B, a transaction encoded in this fashion may originate from a driver of a host system rather than 802.1Q fields. The Sy field represents the securities symbol in a binary format. The Si field represents the transaction side. The two bits of this field encode the transaction type, such as buy long (BL) when the transaction is a purchase for holding, buy cover (BC) when the transaction is a purchase to close or cover a previous short sale, sell long (SL) when the transaction is a sale of securities that are currently held, and sell short (SS) which creates an obligation to sell (cover) the security at a future time. The Qt field represents the quantity of the transaction as a count of corrupted (e.g., by flipping a payload or FCS bit) so that it is discarded by the destination device.

In some embodiments, device 100 may keep track of multiple transactions from a sender to check whether these frames in aggregate violate a rule or policy. This may involve using the memory to store state and/or the processor to perform higher-level calculations. For example, an entity may be restricted such that it can purchase no more than a maximum number of units of a given security per day, or such that its balance cannot go below a certain value (e.g., $0.00). As noted above, when a rule is violated, the frame may be corrupted and forwarded on to the next hop device, or discarded.

Another type of transaction may be a TCP session in general. TCP sessions begin with an initiating device transmitting a SYN packet, which is followed by the responding device transmitting a SYN/ACK packet, and the initiating device then transmitting an ACK packet. These packet types are determined by flags (e.g., SYN and ACK as just two examples) being set in the respective TCP headers.

But TCP session initiation procedures can be used to generate denial of service (DOS) attacks on the recipient device. For example, one or more initiator devices may transmit numerous TCP SYN packets with no intention of actually using any resulting TCP session. This creates a large amount of state in memory of the recipient device as it waits for these sessions to be used.

In order to mitigate this sort of DOS attack, device 100 may look into IP and TCP headers within a data-link layer frame. If the number of TCP SYN packets transmitted by a particular initiator device exceeds a threshold number per unit of time (e.g., 100 per second), device 100 may begin discarding new TCP SYN packets from this initiator device, or disable the input port that the initiator device is using. In an alternative embodiment, device 100 may compare the number of TCP SYN packets transmitted by a particular initiator device to a particular recipient device against such a threshold.

As noted above, certain types of application-layer protocols in various industries (e.g., manufacturing, financial, and scientific) have a limited number of commands and/or parameters used for communication. In these environments, these application layer payloads (e.g., the payload inside of a TCP packet) may be encrypted. However, if the encryption technique is known (which is commonly the case), the limited vocabulary of these protocols is conducive to known-plaintext analysis.

In particular, known-plaintext analysis involves encrypting a number of packets in which the user controls the plaintext content. By modifying this content in various ways, the encryption mechanism can effectively be reverse engineered so that encrypted information in data-link layer frames can be unencrypted without knowledge of the secret (or key) that would otherwise be required to do so.

Device 100 may be programmed to perform this reverse engineering to produce an unencrypted version of a transaction encoded within a data-link layer frame. This allows device 100 to be able to perform checks that it would not otherwise be able to carry out. Further, when a representation of the transaction appears in the 802.1Q field(s) of the frame, device 100 can determine whether the representation matches the encrypted transaction. If it does not, device 100 may begin discarding new frames from the sender, or disable the input port that the sender is using.

In any of the above embodiments, device 100 may remove any non-standard 802.1Q fields used for these validity checking purposes before transmitting the resulting frame (with a new FCS calculation) to a recipient device. Alternatively, these 802.1Q fields may be replaced by all zero values (e.g., all bits in these headers are set to zero).

Further, in any of the above or other embodiments, device 100 may also handle standard 802.1Q fields in the expected fashion. Thus, for example, before transmitting a frame to a recipient device, device 100 may add one or more standard 802.1Q fields (containing VLAN tags) to the frame and recalculate the FCS accordingly.

IV. Example Operations

Figure 4:
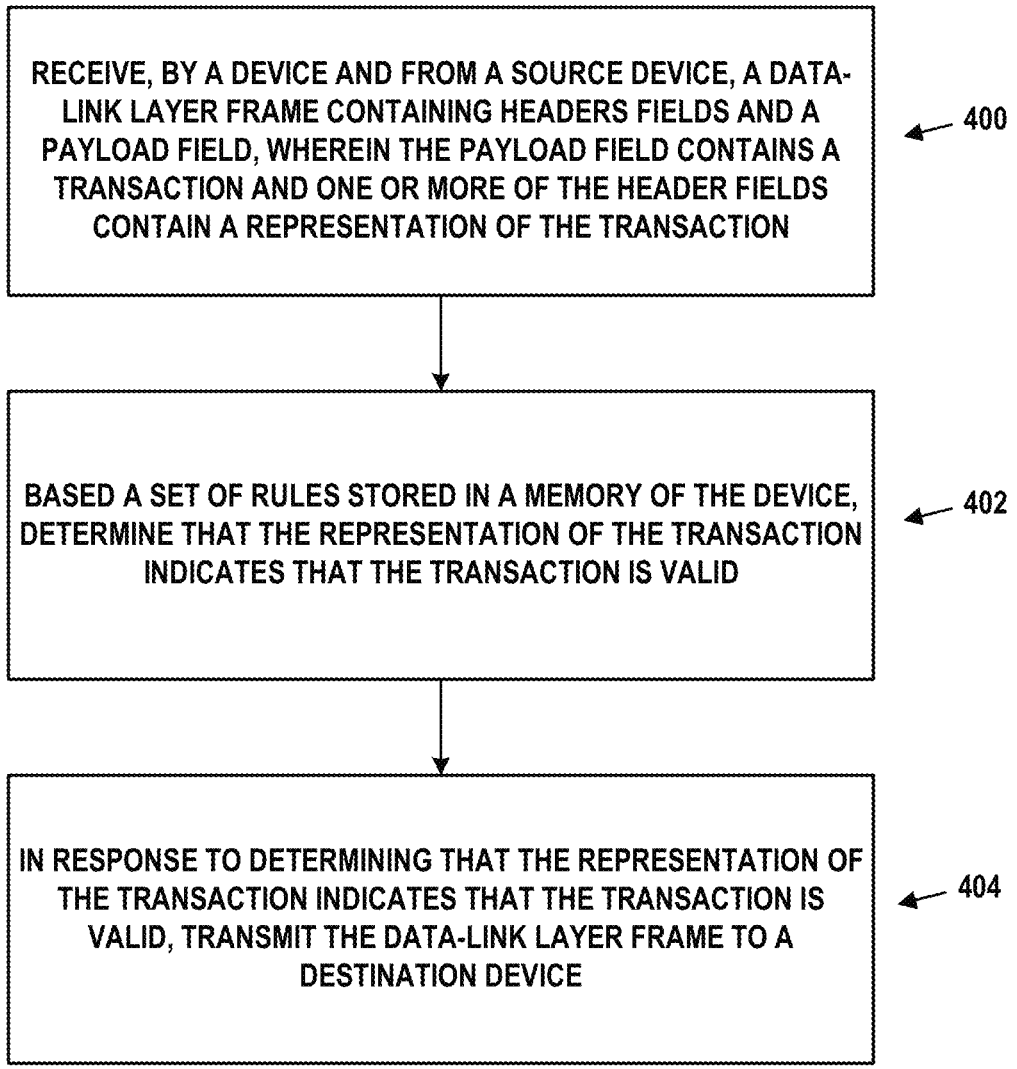
FIG. 4 is a flow chart, in accordance with example embodiments.

FIG. 4 depicts a flow chart illustrating an example embodiment. The process illustrated by FIG. 4 may be carried out by device 100 as described herein (which may be a network interface card 112 or a similarly equipped device). However, the process can be carried out by other types of devices or device subsystems. The embodiments of FIG. 4 may be simplified by the removal of any one or more of the features shown therein. Further, these embodiments may be combined with features, aspects, and/or implementations of any of the previous figures or otherwise described herein.

Block 400 may involve receiving, by a device and from a source device, a data-link layer frame containing headers fields and a payload field, wherein the payload field contains a transaction and one or more of the header fields contain a representation of the transaction.

Block 402 may involve, possibly based a set of rules stored in a memory of the device, determining that the representation of the transaction indicates that the transaction is valid.

Block 404 may involve, possibly in response to determining that the representation of the transaction indicates that the transaction is valid, transmitting the data-link layer frame to a destination device.

In some embodiments, transmitting the data-link layer frame to the destination device comprises: removing the one or more of the header fields containing the representation of the transaction from the data-link layer frame; recalculating a frame check sequence of the data-link layer frame and placing the frame check sequence as recalculated into a frame check sequence field of the data-link layer frame; and transmitting the data-link layer frame as modified to the destination device.

In some embodiments, the device has a plurality of input ports and a plurality of output ports, wherein the device receives the data-link layer frame by way of one of the input ports and transmits the data-link layer frame by way of one of the output ports.

In some embodiments, the data-link layer frame is an Ethernet frame.

In some embodiments, the one or more of the header fields containing the representation of the transaction are 802.1Q fields.

In some embodiments, the representation of the transaction is encoded using fewer bits than an encoding of the transaction in the payload field.

In some embodiments, determining that the representation of the transaction indicates that the transaction is valid comprises: applying a rule from the set of rules to the representation of the transaction; and determining that the representation of the transaction adheres to the rule.

In some embodiments, the sending device and the destination device are different devices.

In some embodiments, the device comprises an integrated circuit and a processor. In some embodiments, the integrated circuit performs the receiving, determining, and transmitting steps. In some embodiments, the integrated circuit performs the receiving, determining, and transmitting steps in real-time. In some embodiments, the integrated circuit performs the receiving, determining, and transmitting steps without having to queue the data-link layer frame.

In some embodiments, determining that the representation of the transaction indicates that the transaction is valid comprises the representation of the transaction passing a first set of validity checks. These embodiments may also involve: providing a copy of the data-link layer frame to the processor; and based a second set of rules stored in the memory, determining that the representation of the transaction or the transaction in the payload field pass a second set of validity checks.

In some embodiments, determining that the representation of the transaction or the transaction in the payload field pass the second set of validity checks comprises: determining that the representation of the transaction or the transaction in the payload field, when considered in combination with other transactions encoded in other data-link layer frames, does not violate any of the second set of rules.

In some embodiments, determining that the representation of the transaction indicates that the transaction is valid comprises the representation of the transaction passing a first set of validity checks. These embodiments may further involve: providing a copy of the data-link layer frame to the processor; and based a second set of rules stored in the memory, determining that the representation of the transaction or the transaction in the payload field do not pass a second set of validity checks.

Some embodiments may involve, in response to determining that the representation of the transaction or the transaction in the payload field do not pass the second set of validity checks, deactivating an input port through which the device received the data-link layer frame.

Some embodiments may involve, in response to determining that the representation of the transaction or the transaction in the payload field do not pass the second set of validity checks, transmitting a cancel command to the destination device, wherein the cancel command causes the destination device to cancel the transaction.

Some embodiments may involve: receiving, by a device and from a source device, a data-link layer frame containing header fields and a payload field, wherein the payload field contains a transaction and one or more of the header fields contain a representation of the transaction; based a set of rules stored in a memory of the device, determining that the representation of the transaction indicates that the transaction is not valid; and in response to determining that the representation of the transaction indicates that the transaction is valid, (i) discarding the data-link layer frame, or (ii) modifying a bit in the data-link layer frame so that the data-link layer frame has an invalid frame check sequence, and transmitting the data-link layer frame as modified to a destination device.

V. Example Low-Level Details

This section provides further details to the embodiments described above. Thus, these embodiments may be combined with any of those disclosed in the context of FIGS. 1A, 1B, 2, 3, and/or 4.

A. Network Architecture

Figure 5:
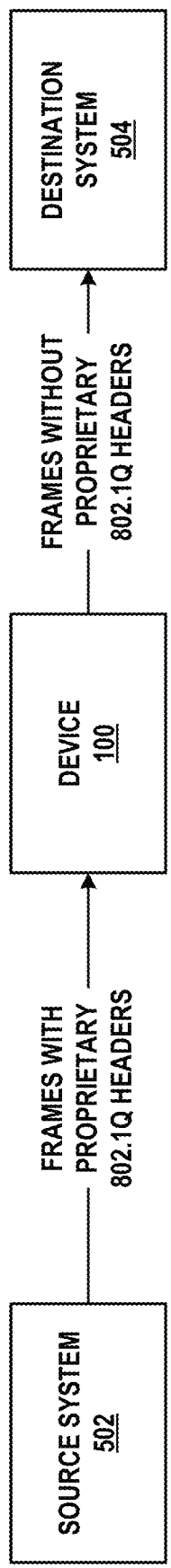
FIG. 5 depicts an arrangement of systems and devices, as well as the flow of frames therebetween, in accordance with example embodiments.

FIG. 5 illustrates an example network architecture involving device 100. Particularly, source system 502 may be transmitting Ethernet frames to network device 100, and these frames may contain one or more of the non-standard 802.1Q fields discussed above. Device 100 may perform validity checks on these frames, and then discard or modify the frames accordingly. The modified frames may be transmitted to destination system 504 without non-standard 802.1Q fields. This means that these frames may have standard 802.1Q fields or no 802.1Q fields at all.

The link between source system 502 and device 100 may be one or more Ethernet segments. While several segments may be used, it is unclear how some switches and routers might respond to receiving frames with the non-standard 802.1Q fields. Thus, source system may be, in some cases, integrated to some extent with device 100.

The link between device 100 and destination system 504 may be one or more Ethernet segments or even a wide-area networking link. Since the frames traversing this link do not have non-standard 802.1Q fields, there can be any reasonable number of intermediate devices (e.g., switches and routers) between device 100 and destination system 504.

Further, while the direction of frame transmission in FIG. 5 is shown to be left-to-right (from source system 502 to device 100 to destination system 504), frames may also flow in the opposite direction. Additionally, in some cases, there may be multiple source systems and/or multiple destination systems.

B. Frame Processing

Figure 6:
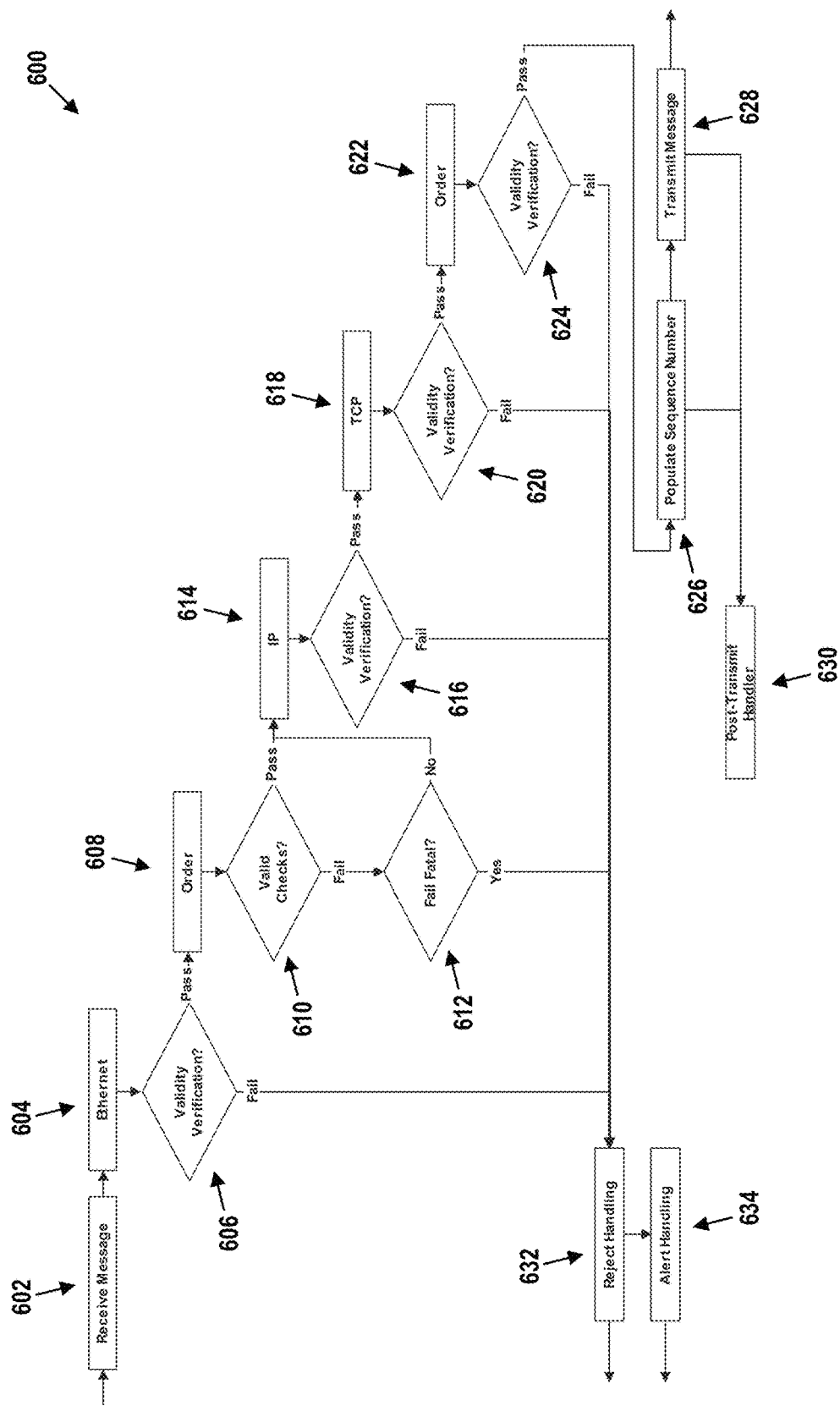
FIG. 6 is a flow chart, in accordance with example embodiments.

Flow chart 600 of FIG. 6 illustrates device 100 processing an incoming frame with non-standard 802.1Q fields. This processing may occur in real time in a cut-through fashion. A frame is received in order of the bits arranged in its header (e.g., destination MAC address first, source MAC address second and so on). As each field is received, it is processed by digital logic in device 100. While the embodiments below describe the frame as being received and then processed, this reception and processing may actually occur in parallel.

At block 602, device 100 receives the frame (referred to as a message in FIG. 6). At block 604, device 100 begins processing of the Ethernet headers. Thus, at block 606, device 100 verifies the validity of these headers. This may include validating the FCS, and determining whether the source and/or destination MAC addresses are permitted. For example, device 100 may be configured to filter out (e.g., discard) frames that are not from a particular set of MAC addresses that correspond to specific source devices of source system 502. Alternatively or additionally, device 100 may be configured to filter out frames from a particular set of MAC addresses that do not correspond to specific source devices, allowing frames from these source devices through for further processing. This processing may be facilitated by a lookup table that contains whitelists and/or blacklists of MAC addresses. In any event, should a frame be filtered out in this fashion, control is passed to block 632.

If the Ethernet MAC addresses pass the checks of block 606, control is passed to block 608. Block 610 parses the transaction encoded in one of more of 802.1Q fields of the frame and applies rules to determine whether the transaction is valid. This may involve a potentially large number of rules that the digital logic can execute at least partially in parallel. Examples of these rules are given below. If it is determined that the transaction adheres to all relevant rules, then the transaction is deemed valid and control passes to block 614. Notably, these rules may involve more than just parsing and analyzing values in one or more 802.1Q fields. In some cases, the rules may require that device 100 maintains a representation of higher level state.

For example, device 100 may maintain a representation of the state of a TCP connection between the source device and the destination device (the destination device may be disposed within or part of destination system 504). If this representation indicates that the connection is open, any frames containing TCP header information that is an attempt to open this connection would be discarded as invalid because an open TCP connection cannot be opened again.

If it is determined that one or more rules have been violated, then at block 612 it is further determined whether any of these violations, individually or in combination, are deemed fatal. This may involve applying further rules to one or more fields within the 802.1Q fields and/or other parts of the frame. If the violations are not fatal, control is passed to block 614. Otherwise, control is passed to block 632 and the frame is discarded.

As noted, the rules described herein are application-specific and may vary between deployments. Further, control over the content and execution of these rule may be given to various entities. For example, an entity associated with source system 502 may mandate that certain rules are used and may have control over the use of these rules, while an entity associated with destination system 504 may mandate that other rules are used and may have control over the use of these rules. In some cases, an entity associated with neither source system 502 nor destination system 504 may mandate that other rules are used and may have control over the use of these rules. As a consequence, the rules that are applied to Ethernet frames may have originated from various entities.

Block 614 may involve processing the IP header within the Ethernet frame and, at block 616, determining whether it is valid. This may include comparing the source and/or destination IP addresses to whitelists or blacklists, as well as performing validity checks of the values of other IP header fields. Again, these checks may be implemented as rules performed by the digital logic of device 100. If the IP header is found to be valid, control passes to block 618. Otherwise, control passes to block 632 and the frame is discarded.

Block 618 may involve processing the TCP header within the Ethernet frame and, at block 620, determining whether it is valid. This may include comparing the source and/or destination port numbers to whitelists or blacklists, as well as performing validity checks of the values of other TCP header fields. Once more, these checks may be implemented as rules performed by the digital logic of device 100. If the TCP header is found to be valid, control passes to block 622. Otherwise, control passes to block 632 and the frame is discarded. Notably, these checks could be for another transport-layer protocol, such as UDP.

Block 622 may involve performing validity checks on the payload of the packet contained within the Ethernet frame. This payload may also be referred to as the transport-layer payload. Even though the transaction was validated by the processing associated with blocks 608, 612, and/or 612, block 624 may involve further validating that the transaction as it is arranged within this payload is properly formatted and the value in each field is appropriate. For example, it is possible that the transaction in the payload has a formatting error even though its representation in one or more 802.1Q fields is valid. If errors are found in the payload, control passes to block 632 and the frame is discarded. Performing this additional set of checks reduces the possibility that the destination device will have to waste resource processing invalid transactions. If the checks indicate that the payload is valid, then control passes to block 626.

Block 626 may involve populating sequence numbers within the TCP header as well as within the payload. Device 100 may discard one or more Ethernet frames transmitted by the source device to the destination device, but the source device may not be aware that some frames are being discarded. Thus, it will continue to generate sequence numbers for both TCP headers and the payload assuming that the discarded packets were actually received by the destination device. The destination device is also unaware that device 100 may be discarding frames, but expects the sequence numbers received to follow pre-established patterns which they may not.

As a simple example, suppose that the application generating the payload uses linearly increasing sequence numbers starting at 1. In each subsequent packet, the sequence number is incremented. Thus, the first frame contains a payload with a sequence number of 1, the second frame contains a payload with a sequence number of 2, the third frame contains a payload with a sequence number of 3, and so on. If device 100 discards the second frame but forwards the first and third frames, the destination device may expect the third frame to have a payload with a sequence number of 2 but instead finds a sequence number of 3. This may cause the destination device to carry out undesirable behaviors, such as discarding the third frame or requesting a retransmission of the data that was within the payload of the second frame. Similar issues may arise at the TCP level where the sequence numbers thereof represent an increasing count (modulo $2^{32}$) of bytes transmitted from sender to recipient.

To accommodate, device 100 may use one or more tables to account for the offsets in sequence numbers due to discarded frames. An example is shown in Table 2.

TABLE 2

| Connection ID | TCP SeqNo Offset | Payload SeqNo Offset |
|---|---|---|
| 1 | 1000 | 1 |
| 2 | 0 | 0 |
| 3 | 5000 | 4 |

In Table 2, the connection ID column refers to a unique connection between the source device and the destination device. This may correspond to a TCP connection or an application-layer session. Thus, the connection ID may be defined by a combination of source and destination MAC addresses, source and destination IP addresses, and/or source and destination port numbers, or in some other fashion. The connection IDs in the table are numeric for sake of simplicity, and may refer to the associated combinations of addresses and port numbers. The TCP SeqNo Offset column may indicate the offset in TCP sequence numbers between the source device and the destination device. The Payload SeqNo Offset column may indicate the offset in payload sequence numbers between the source device and the destination device.

For connection ID 1, there is a TCP SeqNo Offset of 1000 and a Payload SeqNo Offset of 1. This reflects that at least one frame between the associated source device and destination device has been discarded, resulting in a total of 1000 bytes of transport-layer payload being lost, as well as one application payload message. Thus, device 100 may adjust future frames transmitted from the source device to the destination device in accordance with this connection ID by decreasing the TCP sequence number by 1000 and decreasing the payload sequence number by 1. Device 100 may also adjust future frames transmitted from the destination device to the source device in accordance with this connection ID by increasing the TCP sequence number by 1000 and increasing the payload sequence number by 1.

For connection ID 2, there is a TCP SeqNo Offset of 0 and a Payload SeqNo Offset of 0. This reflects that no frames between the associated source device and destination device have been discarded. Therefore, there would be no adjustment of future frames transmitted between the source device and the destination device in accordance with this connection ID.

For connection ID 3, there is a TCP SeqNo Offset of 5000 and a Payload SeqNo Offset of 4. This reflects that at least one frame between the associated source device and destination device has been discarded, resulting in a total of 5000 bytes transport-layer payload being lost, as well as at least one application payload message. Thus, device 100 may adjust future frames transmitted from the source device to the destination device in accordance with this connection ID by decreasing the TCP sequence number by 5000 and decreasing the payload sequence number by 4. Device 100 may also adjust future frames transmitted from the destination device to the source device in accordance with this connection ID by increasing the TCP sequence number by 5000 and increasing the payload sequence number by 4.

Table 2 may be updated each time device 100 discards a frame. For instance, if a frame with 500 bytes of TCP payload and containing one application message is discarded for connection ID 1, the value of TCP SeqNo Offset for connection ID 1 may be updated to 1500 and the value of Payload SeqNo Offset for connection ID 1 may be updated to 2. Further, Table 2 may be adapted to store more or fewer offset values or to represent these values in different ways. For instance, instead of an offset, the table may store the next valid sequence numbers.

Regardless, at block 628, the frame as modified may be transmitted to the destination device. At block 630, post-transmit operations may be carried out, such as updating Table 2, incrementing a count of frames per connection ID, and/or logging the results of the validity checks.

Block 632 involves handling frames that have been (or are going to be) discarded. For instance, block 632 may include operations to update Table 2 or a similar representation of sequence numbers. Other updates to other tables or state representations may be made. If the basis for discarding the frame is severe enough, device 100 may force certain TCP connections and/or application layer sessions to close (e.g., by sending frame to the source device with the TCP RST flag set).

Block 634 may involve other processing such as logging the fact that the frame was discarded, certain values from the frame (e.g., the Ethernet header including the 802.1Q fields), and the reason for the frame being discarded.

Notably, in traditional systems, blocks 608, 610, and 612 do not exist because representations of transactions in the ultimate payload have not been placed in 802.1Q fields until now. With this improvement, most or all Ethernet frames containing invalid transactions do not reach the destination device. This can dramatically reduce the processing load on the destination device, as it does not have to waste resources parsing and discarding (or otherwise handling) invalid frames.

Furthermore, performing these validity checks on a representation of a transaction in 802.1Q fields results in improvements over doing so only on the corresponding representation in the transport-layer payload. The 802.1Q representation and its positioning within the Ethernet header enables the transaction data to be read from bit positions 161 through 224. In contrast, when the representation is only in the transport-layer payload, it appears much later in the frame and more of the frame must be received and parsed before a decision of whether to discard the frame is made.

As an example, for a 205 byte transport-layer payload, the start and end bit positions that represent the transaction in the payload can vary, but the start bit position is unlikely to be less than 496 and the end bit position is unlikely to be less than 2135. The time to read the 802.1Q representation at 10 Gbps transmission speed is approximately 6.21 nanoseconds, while the time to read the transport-layer payload representation at a 10 Gbps transmission speed the time is approximately 158.93 nanoseconds.

Further, when using the 802.1Q representation, the remaining portion of the transmission (with a 205 byte payload) is approximately 2008 bits. When only using the transport-layer payload representation, the remaining portion of the transmission is no less than 32 bits. In terms of processing (again at 10 Gbps transmission speed), the time to read the remaining portion of the transmission when using the 802.1Q representation is approximately 194.72 nanoseconds. When using only the transport-layer payload representation, the processing time is approximately 3.10 nanoseconds. The remaining read time is important because when using only the transport-layer payload representation processing, the time from completion of reading the order until the completion of the transmission (3.10 nanoseconds or 1 clock cycle on average) is insufficient to conduct processing of the order to determine whether the order is acceptable. Thus, only the most minimal processing can be conducted without delaying transmission.

Advantageously, the remaining read time when using the 802.1Q representation method (194.72 nanoseconds or 62.8 clock cycles on average) is more than sufficient to conduct a comprehensive review of the order by conducting a variety of checks prior to the conclusion of the transmission. In fact, the time between completing the reading of the order when using the 802.1Q representation compared to starting the reading of the order from the transport-layer payload representation (26.47 nanoseconds or 8.5 clock cycles on average) is, in itself, sufficient to complete the processing of almost all checks.

Put another way, when using the 802.1Q representation in a cut-through fashion, the order can be read and the checks processed prior to even starting the reading of the order from the transport-layer payload representation. But if only the transport-layer payload representation is used, there is almost no time left for reading the order and performing checks on it before the entire frame is received. Thus, under this latter regime, the frame would have to be delayed in order to perform comprehensive checks.

Similar advantages exist when this technique is used with other technologies, such as machine control systems. The embodiments herein can detect problems from sensor readings faster than traditional techniques, and can more quickly shut down systems with anomalous behavior.

C. Example Rules

FIGS. 7, 8A, and 8B contain representations of rules. This is a partial set of example rules directed to performing validity checks on frames containing orders transmitted by a source device (e.g., from source system 502) to a financial exchange (e.g., within destination system 504). Other rules are possible. Furthermore, this is only one possible example of the types of rules that are supported. Other rule sets, such as those directed to machine control, network firewalls, and/or denial-of-service attack mitigation may be used.

Table 700 of FIG. 7 specifies a number of data sources for rules. The rules are specified in Table 800 of FIGS. 8A and 8B. Each data source has a unique identifier in the ID column of Table 700, which can be referred to in the rules of Table 800.

The location of the data source is specified in the source column of Table 700. A source of M indicates that the data is found in the message (Ethernet frame) being processed. A source of B indicates that the data is found in a memory buffer of device 100.

The name of the data source is specified in the name column of Table 700. Such a name is a convenient way of representing the data source.

A description of the data source is given in the description column of Table 700. Such a description provides a brief overview of the data source and possibly how it can be accessed.

Descriptions of a few examples follow. These examples were selected in a non-limiting fashion to illustrate the operation of the rules.

Data source D001 is from the Ethernet frame being processed, and is the network protocol sequence number. This may be, for instance, a TCP sequence number as discussed above.

Data source D002 is also from the Ethernet frame being processed, and is the network protocol message type. This may be, for example, a TCP segment with the SYN flag set, a TCP segment containing payload data, a TCP segment with the FIN flag set, and so on.

Data source D003 is from a memory buffer that stores the current state of the network protocol. For a TCP-based transaction, this may be the state of the TCP connection, such as open, opening, closed, closing, time-wait, and so on.

Data source D006 is from the Ethernet frame being processed, and is the application protocol sequence number. This may be, for instance, a payload sequence number as discussed above.

Data source D007 is also from the Ethernet frame being processed, and is the application protocol message type. This type may vary based on the application.

Data source D008 is from a memory buffer that stores the current state of the application protocol. This state may also vary based on the application.

Data sources D011-D014 are from the Ethernet frame being processed and represent the side, symbol, price, and quantity. As noted in Table 1, these values may be stored within 802.1Q fields that appear in bits 161-224 of the Ethernet frame.

Table 800 of FIGS. 8A and 8B defines rules that can be applied to information in incoming Ethernet frames and/or stored in memory of device 100. But Table 800 is not a complete set of rules and device 100 can be configured to perform more or fewer rules, and such rules can employ different logic and consider different data sources.

The columns for SE, EB, and PB respectively indicate whether the check is mandated by the sending system (e.g., source system 502), the execution broker, and/or the prime broker. Execution brokers are entities that carry out orders, while prime brokers are entities that coordinate the trading of a vast number of instruments. Orders that arrive at a prime broker may be executed by an execution broker.

As an example, rule 802 involves checking whether the network protocol sequence number in the incoming Ethernet frame is valid. This includes evaluating data source D001 from Table 700. If this sequence number is valid, the Ethernet frame is in compliance with this rule. As noted in the three rightmost columns (and in accordance with the discussion above), if this sequence number is valid it can be re-written based on a sequence number offset table or similar mechanism. Further, the Ethernet frame will not be rejected and no alerts will be generated if the sequence number is re-written.

As a further example, rule 804 involves comparing the network protocol message type indicated by data source D002 to the current state of the network protocol as indicated by data source D003. If execution of this rule indicates that the message type is valid for the state, the Ethernet frame is in compliance with this rule. Otherwise the Ethernet frame is rejected and an alert is generated.

Rules 806 and 808 perform similar functionality as rules 802 and 804, but on the application data in the transport-layer payload.

As yet another example, rule 810 checks that a symbol exists in the Ethernet frame and is valid. This check can be performed on data in the 802.1Q fields, for example. If the symbol is not present in the frame or is invalid, the Ethernet frame is rejected and an alert is generated.

Complex arithmetical and/or Boolean logic operations can be performed in rules. This is shown in rule 812 of FIG. 8B. This rule multiplies the price indicated in data source D013 by the quantity indicated in data source D014 and checks whether the resulting product exceeds a threshold value. If so, the Ethernet frame is rejected and an alert is generated. Both data sources can be found in the non-standard 802.1Q fields of the Ethernet frame.

D. Further Operations

Figure 9A:
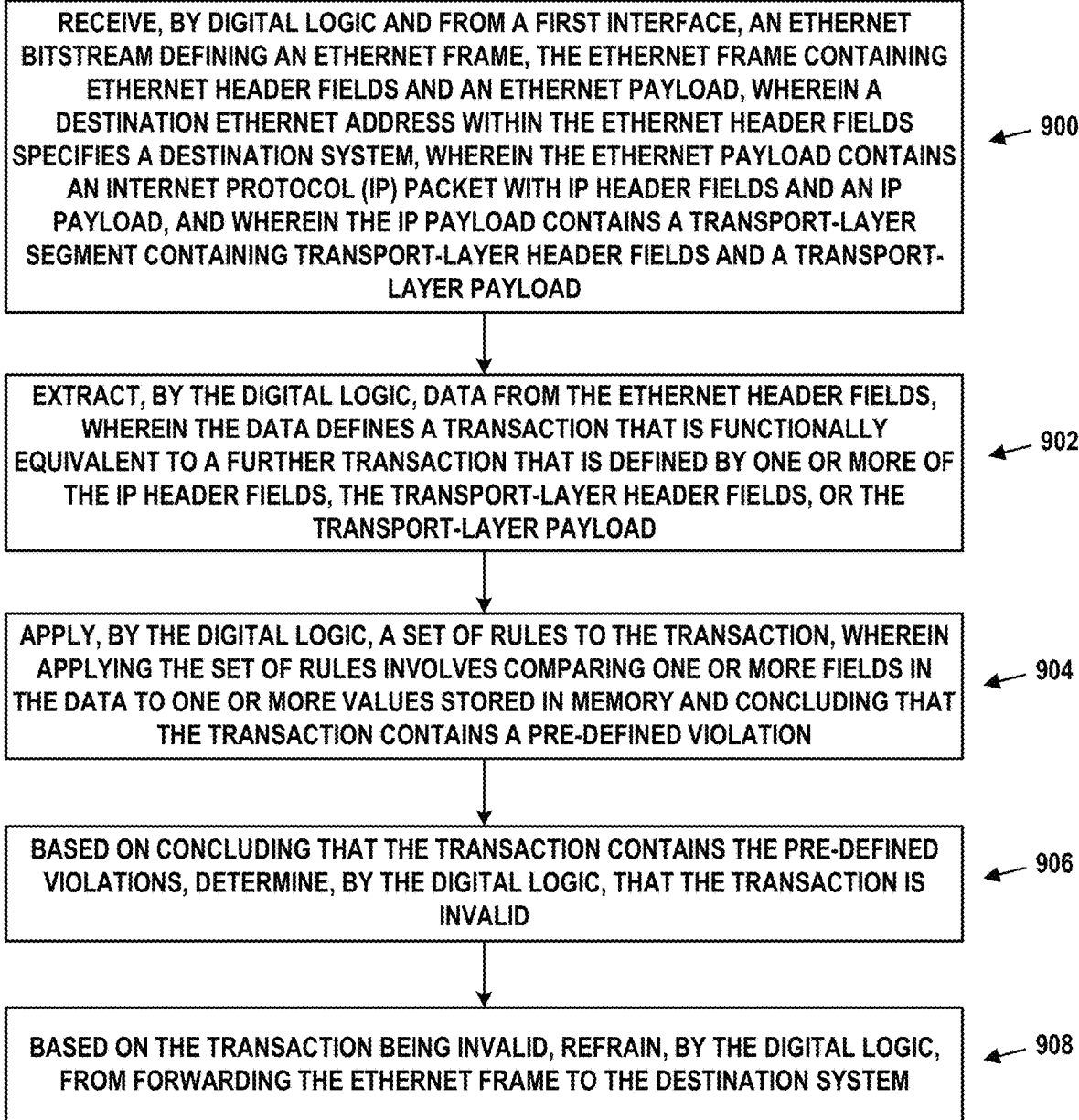
FIGS. 9A and 9B are flow charts, in accordance with example embodiments.
Figure 9B:
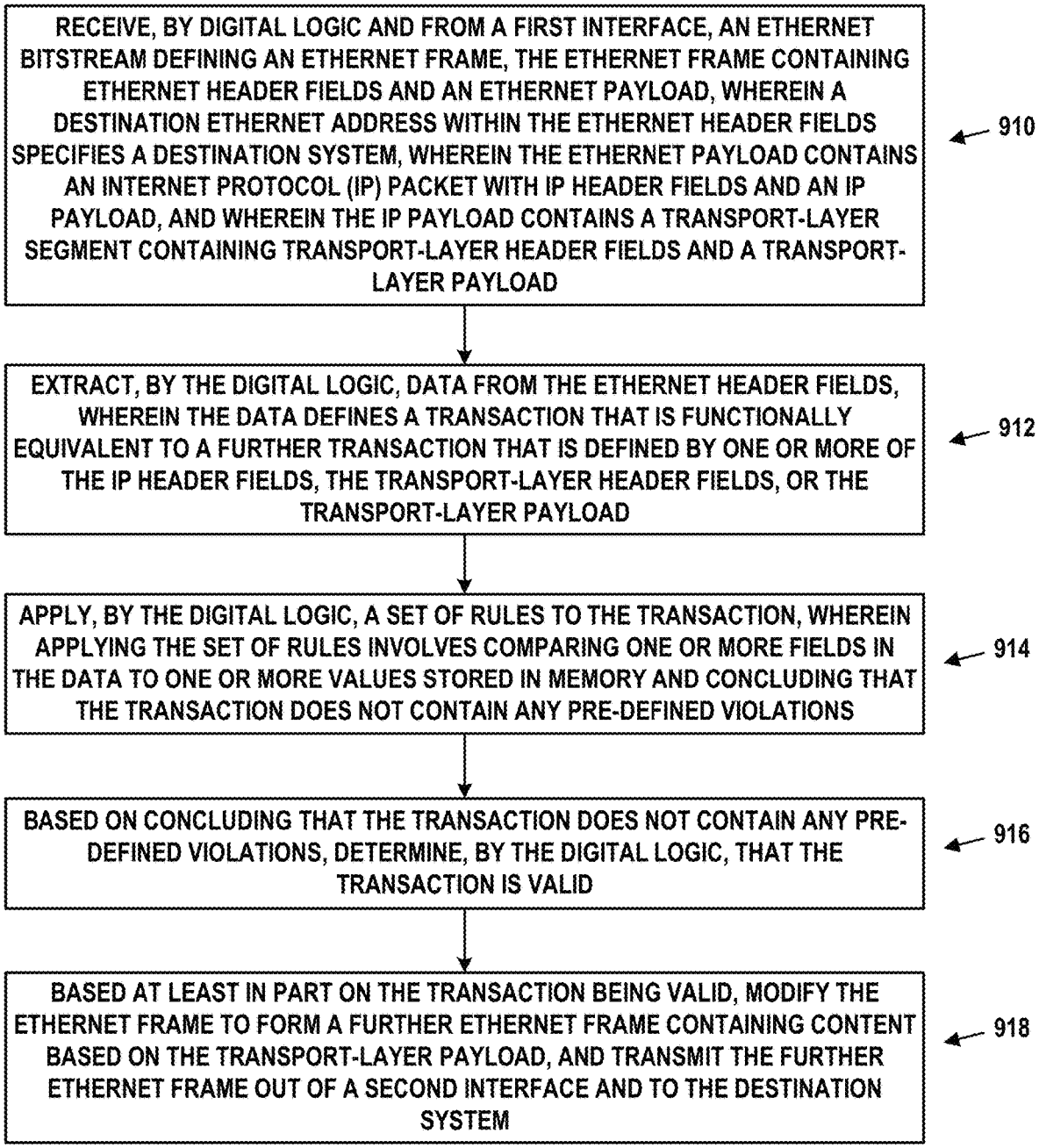

FIGS. 9A and 9B depict flow charts illustrating example embodiments. The processes illustrated by FIGS. 9A and 9B may be carried out by device 100 as described herein (which may be network interface card 112 or a similarly equipped device). However, the processes can be carried out by other types of devices or device subsystems. The embodiments of FIGS. 9A and 9B may be simplified by the removal of any one or more of the features shown therein. Further, these embodiments may be combined with features, aspects, and/or implementations of any of the previous figures or otherwise described herein.

Block 900 may involve receiving, by digital logic and from a first interface, an Ethernet bitstream defining an Ethernet frame, the Ethernet frame containing Ethernet header fields and an Ethernet payload, wherein a destination Ethernet address within the Ethernet header fields specifies a destination system, wherein the Ethernet payload contains an IP packet with IP header fields and an IP payload, and wherein the IP payload contains a transport-layer segment containing transport-layer header fields and a transport-layer payload. The Ethernet bitstream may have been transmitted by a source device of a source system.

Block 902 may involve extracting, by the digital logic, data from the Ethernet header fields, wherein the data defines a transaction that is functionally equivalent to a further transaction that is defined by one or more of the IP header fields, the transport-layer header fields, or the transport-layer payload.

Here, a "functionally equivalent" representation of the further transaction is one that represent all of, or at least part of, the further transaction. Thus, the data may define the transaction to contain less information that the further transaction that appears later in the Ethernet frame. But the information that is in the data is sufficient to determine whether the Ethernet frame should be discarded.

Block 904 may involve applying, by the digital logic, a set of rules to the transaction, wherein applying the set of rules involves comparing one or more fields in the data to one or more values stored in memory and concluding that the transaction contains a pre-defined violation.

Block 906 may involve, possibly based on concluding that the transaction contains the pre-defined violations, determining, by the digital logic, that the transaction is invalid.

Block 908 may involve, possibly based on the transaction being invalid, refraining, by the digital logic, from forwarding the Ethernet frame to the destination system.

Some embodiments may also involve (i) receiving, by way of the first interface, a second Ethernet bitstream defining a second Ethernet frame, the second Ethernet frame containing second Ethernet header fields and a second Ethernet payload, wherein a second destination Ethernet address within the second Ethernet header fields specifies the destination system, wherein the second Ethernet payload contains a second IP packet with second IP header fields and a second IP payload, and wherein the second IP payload contains a second transport-layer segment containing second transport-layer header fields and a second transport-layer payload; (ii) extracting second data from the second Ethernet header fields, wherein the second data defines a second transaction that is functionally equivalent to a second further transaction that is defined by one or more of the second IP header fields, the second transport-layer header fields, or the second transport-layer payload; (iii) applying the set of rules to the second transaction, wherein applying the set of rules involves comparing one or more fields in the second data to the one or more values stored in the memory and concluding that the second transaction does not contain any of the pre-defined violations; (iv) possibly based on concluding that the second transaction does not contain any of the pre-defined violations, determining that the second transaction is valid; and (v) possibly based at least in part on the second transaction being valid, modifying the second Ethernet frame to form a further Ethernet frame containing content based on the second transport-layer payload, and transmitting the further Ethernet frame to the destination system. The further Ethernet frame might not contain any 802.1Q fields, or at least no non-standard 802.1Q fields.

In some embodiments, modifying the second Ethernet frame to form the further Ethernet frame comprises modifying the second Ethernet frame to contain further transport-layer header fields based on the second transport-layer header fields. In some cases, the second transport-layer segment is a TCP segment and the second transport-layer header fields include a sequence number field containing a sequence number value, and the further transport-layer header fields include a further sequence number field containing a further sequence number value that is based on the sequence number value.

In some embodiments, the second transport-layer payload, when received by the device, contained a sequence number field containing a sequence number value, wherein modifying the second Ethernet frame to form the further Ethernet frame comprises modifying the sequence number field to contain a further sequence number value based on the sequence number value.

In some embodiments, reception of the second transaction by the destination system causes the destination system to carry out the second transaction.

In some embodiments, the source device is coupled to the device by no more than one or two Ethernet segments.

In some embodiments, the source device is physically integrated with the device in a chassis.

In some embodiments, extracting data from the Ethernet header fields comprises extracting data from one or more 802.1Q fields within the Ethernet header fields. In some of these embodiments, the one or more 802.1Q fields are formatted in a non-standard fashion.

In some embodiments, the data is encoded in a sequence of fields, the fields associated with respective starting bit locations and respective ending bit locations, wherein extracting the data from the Ethernet header fields comprises extracting the data into locations of the memory based on the respective starting bit locations and respective ending bit locations.

In some embodiments, the further transaction is fully defined within the transport-layer payload.

In some embodiments, comparing one or more fields in the data to one or more values stored in the memory and concluding that the transaction contains one of the pre-defined violations comprises determining, from the one or more fields and the one or more values stored in the memory, that an item in the transaction is singly or in combination with other items in the transaction: (i) in conflict with, or a duplicate of, a previous transaction, (ii) prohibited, (iii) defines a quantity more than a threshold quantity, or (iv) defines an overall value of the transaction that is more than a threshold value.

Some embodiments may further involve, possibly based on the transaction being invalid, blocking further Ethernet frames received from the source device from being processed.

FIG. 9B involves operations that may be carried out independently of or in conjunction with the operations of FIG. 9A. Block 910 of FIG. 9B may involve receiving, by digital logic and from a first interface, an Ethernet bitstream defining an Ethernet frame, the Ethernet frame containing Ethernet header fields and an Ethernet payload, wherein a destination Ethernet address within the Ethernet header fields specifies a destination system, wherein the Ethernet payload contains an IP packet with IP header fields and an IP payload, and wherein the IP payload contains a transport-layer segment containing transport-layer header fields and a transport-layer payload. The Ethernet bitstream may have been transmitted by a source device of a source system.

Block 912 may involve extracting, by the digital logic, data from the Ethernet header fields, wherein the data defines a transaction that is functionally equivalent to a further transaction that is defined by one or more of the IP header fields, the transport-layer header fields, or the transport-layer payload.

Block 914 may involve applying, by the digital logic, a set of rules to the transaction, wherein applying the set of rules involves comparing one or more fields in the data to one or more values stored in memory and concluding that the transaction does not contain any pre-defined violations.

Block 916 may involve, possibly based on concluding that the transaction does not contain any pre-defined violations, determining, by the digital logic, that the transaction is valid.

Block 918 may involve, possibly based at least in part on the transaction being valid, the digital logic: modifying the Ethernet frame to form a further Ethernet frame containing content based on the transport-layer payload, and transmitting the further Ethernet frame out of a second interface and to the destination system. The further Ethernet frame might not contain any 802.1Q fields, or at least no non-standard 802.1Q fields.

In some embodiments, modifying the Ethernet frame to form the further Ethernet frame comprises modifying the Ethernet frame to contain further transport-layer header fields based on the transport-layer header fields.

In some embodiments, the transport-layer payload, when received by the device, contained a sequence number field containing a sequence number value, wherein modifying the Ethernet frame to form the further Ethernet frame comprises modifying the sequence number field to contain a further sequence number value based on the sequence number value. In these embodiments, the transport-layer segment is a TCP segment and the transport-layer header fields include a sequence number field containing a sequence number value, wherein the further transport-layer header fields include a further sequence number field containing a further sequence number value that is based on the sequence number value.

In some embodiments, extracting data from the Ethernet header fields comprises extracting data from one or more 802.1Q fields within the Ethernet header fields. In these embodiments, the further Ethernet frame might not include the 802.1Q fields.

In some embodiments, the data is encoded in a sequence of fields, the fields associated with respective starting bit locations and respective ending bit locations, wherein extracting the data from the Ethernet header fields comprises extracting the data into locations of the memory based on the respective starting bit locations and respective ending bit locations.

In some embodiments, reception of the transaction by the destination system causes the destination system to carry out the transaction.

VI. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A device comprising:
a network interface;
memory containing a set of rules and representations of pre-defined violations thereof; and
digital logic programmed to:
receive, by way of the network interface, a datalink frame containing a header and an application payload, wherein the application payload encodes a transaction in a first format and the header encodes content of the transaction in a second format that is different from the first format, and wherein the transaction in the second format is located within one or more 802.1Q fields within the header;
compare, in accordance with the rules, at least some of the transaction in the second format to one or more values stored in the memory;
based on the comparison, determine that the transaction in the first format is invalid; and
based on the transaction in the first format being invalid, refrain from forwarding the datalink frame.

2. The device of claim 1, wherein comparing at least some of the transaction in the second format to the one or more values stored in the memory comprises determining whether the transaction in the second format contains at least one of the pre-defined violations of the set of rules.

3. The device of claim 1, wherein determining that the transaction in the first format is invalid comprises determining that the transaction in the first format contains at least one of the pre-defined violations of the set of rules.

4. The device of claim 1, wherein the one or more 802.1Q fields are not formatted in accordance with 802.1Q standards.

5. The device of claim 1, wherein the one or more 802.1Q fields do not contain virtual local area network (VLAN) tags.

6. The device of claim 1, wherein the digital logic is further programmed to:
receive, by way of the network interface, a second datalink frame containing a second header and a second application payload, wherein the second application payload encodes a second transaction in the first format and the second header encodes the second transaction in the second format;
compare, in accordance with the rules, at least some of the second transaction in the second format to the one or more values stored in the memory;
based on the comparison of at least some of the second transaction, determine that the second transaction in the first format is valid; and
based on the second transaction in the first format being valid, forward a representation of the second datalink frame to a destination device.

7. The device of claim 6, further comprising:
a second network interface, wherein forwarding the representation of the second datalink frame to the destination device comprises forwarding the representation of the second datalink frame by way of the second network interface.

8. The device of claim 1, wherein the datalink frame is received from a source device, and wherein the source device is coupled to the device by no more than one or two datalink layer segments.

9. The device of claim 1, wherein the datalink frame is received from a source device, and wherein the source device is physically integrated with the device in a chassis.

10. The device of claim 1, wherein the datalink frame is received from a source device, and wherein the digital logic is further configured to:
based on the transaction in the first format being invalid, block further datalink frames received from the source device from being processed by the digital logic.

11. The device of claim 1, wherein the transaction in the second format is encoded in a sequence of fields, the fields associated with respective starting bit locations and respective ending bit locations, and wherein comparing at least some of the transaction in the second format to the one or more values stored in the memory comprises:
copying at least some the transaction in the second format into locations of the memory based on the respective starting bit locations and respective ending bit locations.

12. The device of claim 1, wherein determining determine that the transaction in the first format is invalid comprises:
determining, from at least some of the transaction in the second format and the set of rules and representations of pre-defined violations stored in the memory, that an item in the transaction in the first format is singly or in combination with other items in the transaction in the first format: (i) in conflict with, or a duplicate of, a previous transaction, (ii) prohibited, (iii) defines a quantity more than a threshold quantity, or (iv) defines a value that, in combination with other values related to the transaction, is more than a threshold value.

13. A device comprising:
a network interface;
memory containing a set of rules and representations of pre-defined violations thereof; and
digital logic programmed to:
receive, by way of the network interface, a datalink frame containing a header and an application payload, wherein the application payload encodes a transaction in a first format and the header encodes content of the transaction in a second format that is different from the first format, and wherein the transaction in the second format is located within one or more 802.1Q fields within the header;
compare, in accordance with the rules, at least some of the transaction in the second format to one or more values stored in the memory;
based on the comparison, determine that the transaction in the first format is valid; and
based on the transaction in the first format being valid, forward a representation of the datalink frame to a destination device.

14. The device of claim 13, wherein determining determine that the transaction in the first format is valid comprises:
determining, from at least some of the transaction in the second format and the set of rules and representations of pre-defined violations stored in the memory, that an item in the transaction in the first format is not singly or in combination with other items in the transaction in the first format: (i) in conflict with, or a duplicate of, a previous transaction, (ii) prohibited, (iii) defines a quantity more than a threshold quantity, or (iv) defines a value that, in combination with other values related to the transaction, is more than a threshold value.

15. A method comprising:
receiving, by digital logic and by way of a network interface, a datalink frame containing a header and an application payload, wherein the application payload encodes a transaction in a first format and the header encodes content of the transaction in a second format that is different from the first format, wherein the transaction in the second format is located within one or more 802.1Q fields within the header, and wherein memory contains a set of rules and representations of pre-defined violations thereof;
comparing, by the digital logic and in accordance with the rules, at least some of the transaction in the second format to one or more values stored in the memory;
based on the comparison, determining, by the digital logic, that the transaction in the first format is invalid; and
based on the transaction in the first format being invalid, refraining, by the digital logic, from forwarding the datalink frame.

16. The method of claim 15, wherein comparing at least some of the transaction in the second format to the one or more values stored in the memory comprises determining whether the transaction in the second format contains at least one of the pre-defined violations of the set of rules.

17. The method of claim 15, wherein determining that the transaction in the first format is invalid comprises determining that the transaction in the first format contains at least one of the pre-defined violations of the set of rules.

18. The method of claim 15, wherein the transaction in the second format is encoded in a sequence of fields, the fields associated with respective starting bit locations and respective ending bit locations, and wherein comparing at least some of the transaction in the second format to the one or more values stored in the memory comprises:
copying at least some the transaction in the second format into locations of the memory based on the respective starting bit locations and respective ending bit locations.

19. The method of claim 15, wherein determining determine that the transaction in the first format is invalid comprises:

> determining, from at least some of the transaction in the second format and the set of rules and representations of pre-defined violations stored in the memory, that an item in the transaction in the first format is singly or in combination with other items in the transaction in the first format: (i) in conflict with, or a duplicate of, a previous transaction, (ii) prohibited, (iii) defines a quantity more than a threshold quantity, or (iv) defines a value that, in combination with other values related to the transaction, is more than a threshold value.

* * * * *